United States Patent
Wada et al.

(10) Patent No.: US 6,748,383 B1
(45) Date of Patent: Jun. 8, 2004

(54) GEOGRAPHIC INFORMATION INDICATOR, METHOD FOR DISPLAYING GEOGRAPHIC INFORMATION AND STORAGE MEDIUM FOR STORING PROGRAM FOR EXECUTING THE SAME

(75) Inventors: Kiyoshi Wada, Tokyo (JP); Yasuo Nagai, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 171 days.

(21) Appl. No.: 09/680,055

(22) Filed: Oct. 5, 2000

(30) Foreign Application Priority Data

Oct. 6, 1999 (JP) .......................................... 11-285656

(51) Int. Cl.$^7$ ............................................. G06F 17/30
(52) U.S. Cl. ........................ 707/10; 707/101; 701/208; 709/218
(58) Field of Search ........................... 707/1–10, 501.1, 707/518, 100–104.1; 709/218, 219; 701/208, 212, 225

(56) References Cited

U.S. PATENT DOCUMENTS 5,839,088 A * 11/1998 Hancock et al. ............ 701/213
5,930,474 A * 7/1999 Dunworth et al. ............ 707/10
6,125,367 A * 9/2000 NA .......................... 707/104.1

FOREIGN PATENT DOCUMENTS

JP 10-124528 5/1998

OTHER PUBLICATIONS

Moses et al., User performance under several automated approaches to changing displayed maps, Year 1978, pp. 228–233.*

* cited by examiner

Primary Examiner—Shahid Alam
Assistant Examiner—Jean Bolte Fleurantin
(74) Attorney, Agent, or Firm—Oblon, Spivak, McClelland, Maier & Neustadt, P.C.

(57) ABSTRACT

The geographic information indicator further includes means for storing a range within which the data is stored in the local database in a form of a local database effective range information, local database effective range check means for deciding a first area within which the data is already stored in the local database and a second area within which the data is not stored in the local database, server-side database retrieval request means for inquiring the database server via the network about the data included in the second area, local database update means for additionally storing the data obtained as a retrieval result, in the local database and also updating the local database effective range information based on the second area, local database retrieval means for extracting the data included in the screen display range from the local database, and screen display means for displaying the data extracted from the local database on a screen.

13 Claims, 21 Drawing Sheets

FIGURE DATA CONFIGURATION EXAMPLE

BROKEN LINE

| KEY | FIGURE KIND | COLOR | LINE WIDTH | NO. OF COORDINATES | BROKEN POINT COORDINATE TRAIN |
|-----|-------------|-------|------------|---------------------|-------------------------------|
| 1234 | BROKEN LINE | RED | 1 | 3 | (100,100),(200,100),(200,150) |
| 1235 | BROKEN LINE | GREEN | 3 | 2 | (200,150),(300,300) |

KEY: KEY FOR IDENTIFYING FIGURE DATA
FIGURE KIND: KIND FOR IDENTIFYING THE KIND OF FIGURE DATA
COLOR: DESIGNATING THE DISPLAY COLOR OF A LINE
LINE WIDTH: DESIGNATING THE WIDTH OF A LINE
NO. OF COORDINATES: DESIGNATING THE NUMBER OF POINTS INCLUDED IN THE BROKEN POINT COORDINATE TRAIN
BROKEN POINT COORDINATE TRAIN: SEQUENTIALLY DESIGNATING THE END POINTS CONSTITUTING THE BROKEN POINTS AND COORDINATES OF BROKEN POINTS

FIG. 3

CHARACTER STRING

| KEY | FIGURE KIND | COLOR | START POINT COORDINATES | CHARACTER STRING |
|------|-----------------|-------|--------------------------|----------------------|
| 2245 | CHARACTER STRING | RED | (110, 110) | "NAGATA-CHO" |
| 2246 | CHARACTER STRING | BLACK | (310, 310) | "NISHIGUCHI BUILDING" |

KEY: KEY FOR IDENTIFYING FIGURE DATA
KIND: KIND FOR IDENTIFYING THE KIND OF FIGURE DATA
COLOR: DESIGNATING THE DISPLAY COLOR OF A CHARACTER STRING
START POINT COORDINATES: DESIGNATING THE LOWER LEFT COORDINATES OF A CHARACTER STRING
CHARACTER STRING: CHARACTER STRING TO BE DISPLAYED

FIG. 3 (Continued)

SYMBOL

| KEY | FIGURE KIND | COLOR | CENTER COORDINATES | SYMBOL KIND |
|---|---|---|---|---|
| 3255 | SYMBOL | RED | (210, 110) | POWER STATION |
| 3256 | SYMBOL | BLACK | (410, 310) | SCHOOL |

KEY: KEY FOR IDENTIFYING FIGURE DATA
FIGURE KIND: KIND FOR IDENTIFYING THE KIND OF FIGURE DATA
COLOR: DESIGNATING THE DISPLAY COLOR OF A CHARACTER STRING
CENTER COORDINATES: DESIGNATING THE COORDINATES OF THE POINT WHERE THE ENTER OF A SYMBOL IS POSITIONED
SYMBOL KIND: NAME FOR DESIGNATING THE KIND OF A SYMBOL

FIG. 3 (Continued)

[EFFECTIVE RANGE LIST]

|     | LOWER LEFT COORDINATE OF RECTANGLE | UPPER RIGHT COORDINATE OF RECTANGLE | LAST REFERENCE TIME |
| --- | --- | --- | --- |
| (a) | (100,400) | (200,450) | 1999/10/2 14:00.01.00 |
| (b) | (500,200) | (700,420) | 1999/10/2 14:00.05.45 |
| (c) | (350,250) | (360,260) | 1999/10/2 14:00.06.03 |
| (d) | (250,150) | (350,200) | 1999/10/2 12:34.31.02 |
| (e) | (300,120) | (400,170) | 1999/10/2 12:11.15.23 |

GEOGRAPHIC INFORMATION INDICATOR, METHOD FOR DISPLAYING GEOGRAPHIC INFORMATION AND STORAGE MEDIUM FOR STORING PROGRAM FOR EXECUTING THE SAME

BACKGROUND OF THE INVENTION

1. Field of the Invention

This invention relates to a geographic information indicator using a system composed of a database server computer and a client computer installed on Internet or Intranet, and more particularly to a geographic information indicator for displaying geographic information stored in the database server computer on the client computer. This invention further relates to a method for displaying geographic information stored in the database server computer on the client computer and a storage medium for storing a program for executing it.

2. Description of the Related Art

FIG. 18 is a block diagram of a conventional geographic information indicator using a system composed of a database server 2, a WWW (world-wide web) 3 and a client computer 1 installed on Internet or Intranet. The database server 2 executes the retrieval process for a database inquiry received from the client computer 1 via the WWW server 3 on a master database 21 in the database server 2 and returns the result thereof to the client computer 1 via the WWW server 3.

The WWW server 3 relays data between the client computer 1 and the database server 2. The client computer 1 is composed of a screen display request input means 11, a server-side database retrieval request means 14, a screen display means 18, a data cache management means 121, and a data cache 120.

A WWW browser is used for the client computer 1. In the data cache 120, a set of an inquiry sent from the client computer 1 to the database server 2 in the past via the WWW server 3 and the retrieval result thereof returned to the client computer 1 from the database server 2 via the WWW server 3 is stored. The screen display request input means 11 inputs a screen display request from a user.

The data cache management means 121 checks by retrieving the data cache 120 whether or not the same inquiry as the screen display request received from the screen display request input means 11 was made in the past. When the same inquiry was made in the past, the data cache management means 121 obtains the retrieval result from the data cache 120 and transfers it to the screen display means 18.

When such an inquiry was not made in the past, an inquiry is made to the database server 2 from the server-side database retrieval request means 14 via the WWW server 3. When the retrieval result by the database server 2 is returned to the client computer 1 via the WWW server 3, the data cache management means 121 newly adds a set of the inquiry and retrieval result to the data cache 120. The retrieval result by the database server 2 is displayed by the screen display means 18.

In the aforementioned prior art, when the information requested by the screen display request in this time is the same as the information requested once in the past, the requested information can be displayed using the data stored in the data cache without inquiring the database server once again. However, when the display request range is deviated from the range requested once in the past, even if an inquiry is made for the data in the greater part of the area of the display request range in the past, another inquiry is required to be made for the overall area of the display request range to the database server. As a result, it takes a lot of time for the data transfer.

Furthermore, when a screen display request is made for the display range overlapping with the past display range, a number of data overlapping with data obtained in the past must be stored in the data cache. As a result, the utilization factor of the data cache is reduced.

SUMMARY OF THE INVENTION

Accordingly, one object of this invention is to provide a geographic information indicator, a method for displaying geographic information and a storage medium for storing program for executing the same which can shorten the data transfer time without inquiring the database server once again about the information displayed once.

Another object of this invention is to provide a geographic information indicator, a method for displaying geographic information and a storage medium for storing program for executing the same which can increase the utilization factor of the database.

These and other objects of this invention can be achieved by providing a geographic information indicator for displaying an information obtained from a database server for storing the information of a map and facilities to be arranged on the map via a network, including a local database for storing a data obtained from the database server by an inquiry, and screen display request input means for inputting a screen display request by designating a screen display range. The geographic information indicator further includes means for storing a range within which the data is stored in the local database in a form of a local database effective range information, the range being represented by overlapping a plurality of areas, local database effective range check means for deciding a first area within which the data is already stored in the local database and a second area within which the data is not stored in the local database out of the designated screen display range based on the local database effective range information, and server-side database retrieval request means for inquiring the database server via the network about the data included in the second area based on a decision result of the local database effective range check means. The geographic information indicator also includes local database update means for additionally storing the data obtained as a retrieval result from the database server via the network in the local database and also updating the local database effective range information based on the second area, local database retrieval means for extracting the data included in the screen display range necessary for screen display from the data stored in the local database, and screen display means for displaying the data extracted from the local database on a screen.

According to one aspect of this invention, there is provided a geographic information indicator for displaying an information obtained from a database server for storing the information of a map and facilities to be arranged on the map via a network including a local database for storing a data obtained from the database server by an inquiry, and screen display request input means for inputting a screen display request in a form of a rectangular range. The geographic information indicator further includes means for storing an effective range within which the data is stored in the local database in a form of a local database effective range information, the effective range being represented by overlapping a plurality of the rectangular ranges, local database effective range check means for deciding a first range expressed in the form of the rectangular range within which the data is already stored in the local database and a second range expressed in the form of the rectangular range within which the data is not stored in the local database out of the rectangular range designated by the screen display request based on the effective range in the local database effective range information, and server-side database retrieval request means for inquiring the database server via the network about the data included in the second range based on a decision result of the local database effective range check means. The geographic information indicator also includes local database update means for additionally storing the data obtained as a retrieval result from the database server via the network in the local database, and also for updating the effective range in the local database effective range information based on the rectangular range, local database retrieval means for extracting the data included in the rectangular range from the data stored in the local database, and screen display means for displaying the data extracted from the local database on a screen.

According to another aspect of this invention, there is provided a program storing medium readable by a computer, tangibly embodying a program of instructions executable by the computer to perform method steps for a geographic information indicator for displaying a data stored in a local database which is obtained from a database server for storing an information of a map and facilities to be arranged on the map via a network. The method includes the steps of a screen display request input step for inputting a screen display request by designating a screen display range, and a step for storing a range within which the data is stored in the local database in a form of a local database effective range information, the range being represented by overlapping a plurality of areas. The methods further includes a local database effective range check step for deciding a first area within which the data is already stored in the local database and a second area within which the data is not stored in the local database out of the designated screen display range based on the local database effective range information, and a server-side database retrieval request step for inquiring the database server via the network-about the data included in the second area based on a decision result of the local database effective range check step. The method further includes a local database update step for additionally storing the data obtained as a retrieval result from the database server via the network in the local database and also updating the local database effective range information based on the second area, a local database retrieval step for extracting the data included in the screen display range necessary for screen display from the data stored in the local database, and a screen display step for displaying the data extracted from the local database on a screen.

According to still another aspect of this invention, there is provided a method for indicating a geographic information to supply a user a data stored in a local database which is obtained from a database server for storing an information of a map and facilities to be arranged on the map via a network. The method includes the steps of a step for urging the user to input a screen display request along with a screen display range, and a step for storing a range within which the data is stored in the local database in a form of a local database effective range information, the range being represented by overlapping a plurality of areas. The method further includes a step for deciding a first area within which the data is already stored in the local database and a second area within which the data is not stored in the local database out of the designated screen display range based on the local database effective range information, a step for inquiring the database server via the network about the data included in the second area based on a decision result. The method also includes a step for additionally storing the data obtained as a retrieval result from the database server via the network in the local database and also updating the local database effective range information based on the second area, a step for extracting the data included in the screen display range necessary for screen display from the data stored in the local database, and a step for transmitting the data extracted from the local database to a terminal of the user.

BRIEF DESCRIPTION OF THE DRAWINGS

The accompanying drawings, which are incorporated in and constitute a part of this specification, illustrate several preferred embodiments of the present invention, and together with the description, serve to explain the principles of the present invention, wherein:

FIG. 3 is a drawing showing the example of components of the data representing geographic information;

DETAILED DESCRIPTION OF THE PREFERRED EMBODIMENTS

Figure 1:
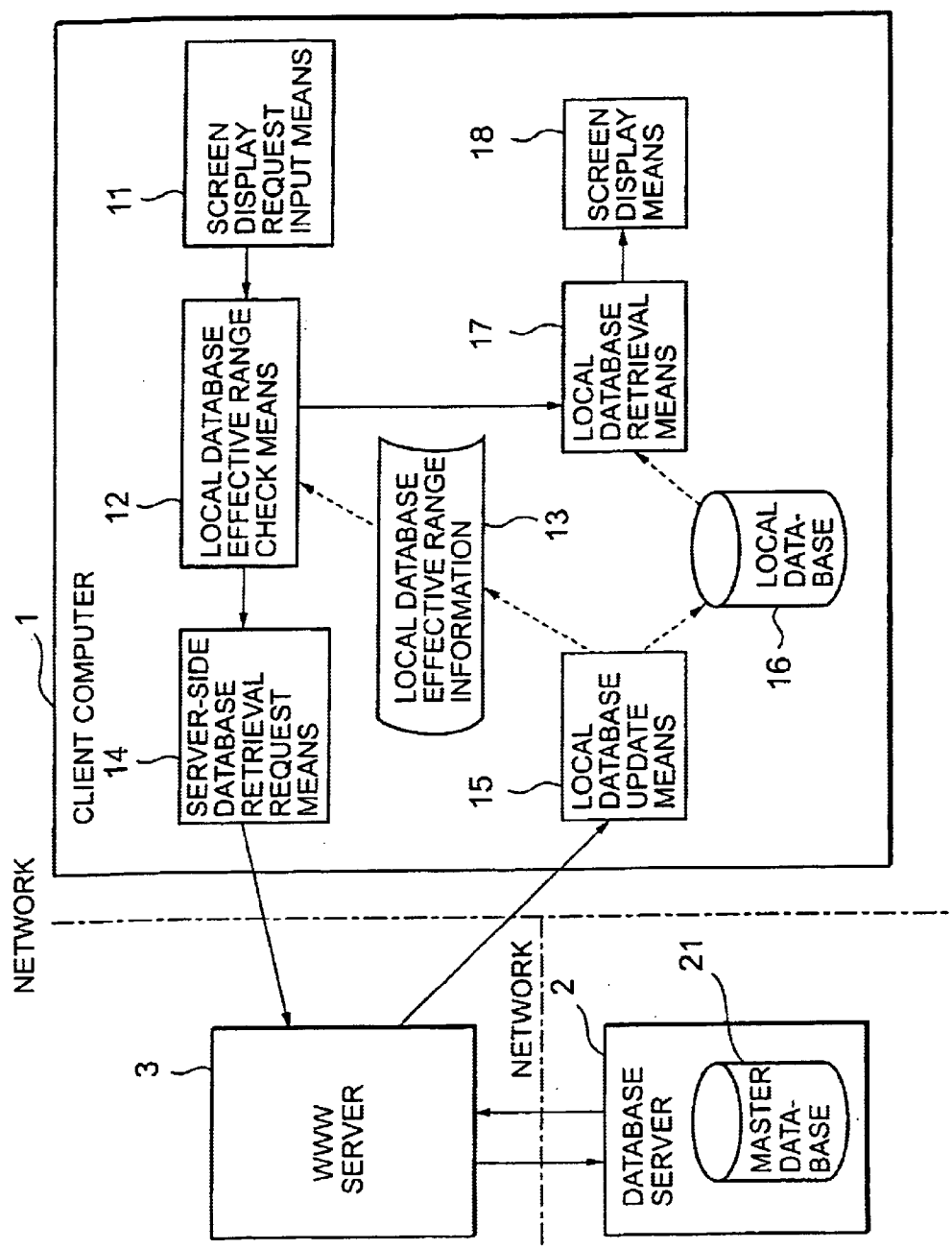
FIG. 1 is a block diagram of a geographic information indicator according to a first embodiment of the present invention.

Referring now to the drawings, wherein like reference numerals designate identical or corresponding parts throughout the several views, the embodiments of this invention will be described below. Wherever possible, the same reference numbers are used throughout the drawings to refer to the same or like parts.

Embodiment 1

Figure 18:
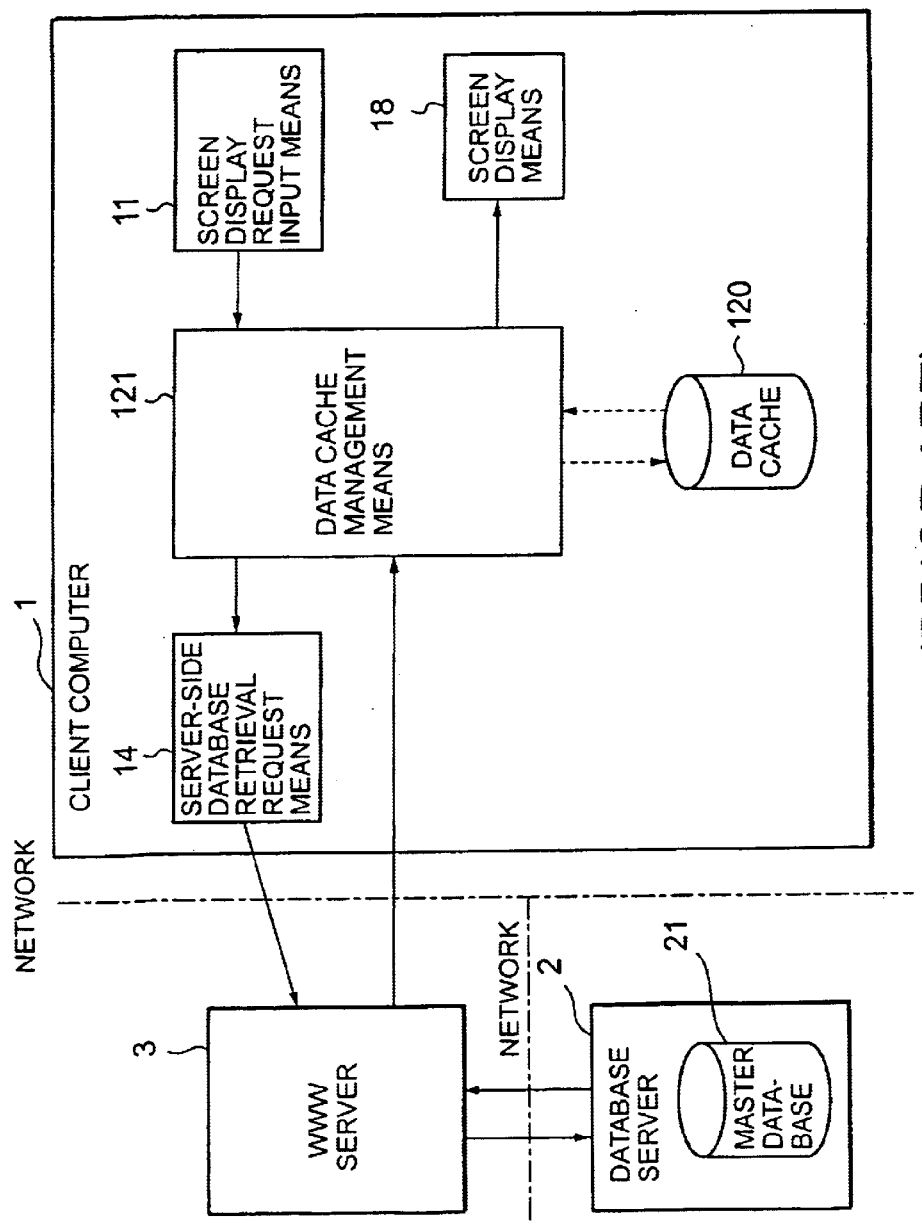
FIG. 18 is a block diagram of a conventional geographic information indicator.

FIG. 1 is a block diagram of a geographic information indicator according to a first embodiment of the present invention, which is composed of the client computer 1, the database server 2, and the WWW server 3. In FIG. 1, the same numeral is assigned to each of the parts having the same functions as those shown in FIG. 18 and the explanation thereof will be omitted.

The characteristic point of this embodiment in the construction is in the client computer 1. That is, it is provided with the screen display request input means 11, the server-side database retrieval request means 14 and the screen display means 18. The client computer 1 is further provided with a local database effective range check means 12, a local database effective range information 13, a local database update means 15, a local database 16, and a local database retrieval means 17, instead of the data cache 120 and the data cache management means 121 shown in FIG. 18.

Figure 5:
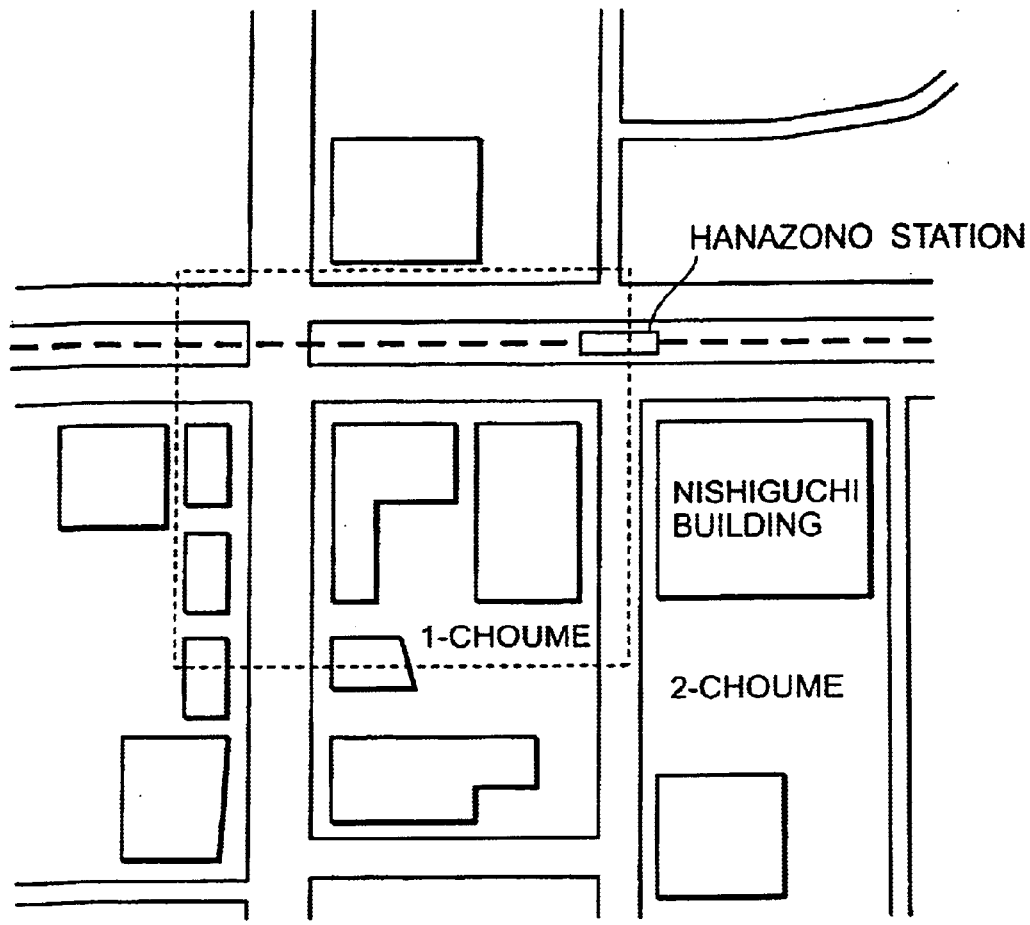
FIG. 5 is a drawing showing the selection of a rectangular range on geographic information.

The database server 2 is composed of the master database 21 and a database management system (DBMS). The screen display request input means 11 obtains a screen display request range from a user. This range is obtained in the form of a rectangular range shown by a dashed line in the coordinate system represented on the master database 21 in FIG. 5.

The local database 16 holds the information obtained by the past inquiry for the database server 2 in the form of components. That is, the information is divided into components such as (1) broken lines showing roads and the structure of buildings, (2) character strings on a map, and (3) symbols of facilities arranged on the map. The components include broken lines, character strings, and symbols, and they are represented in the form of records as shown in FIG. 3.

Figure 4:
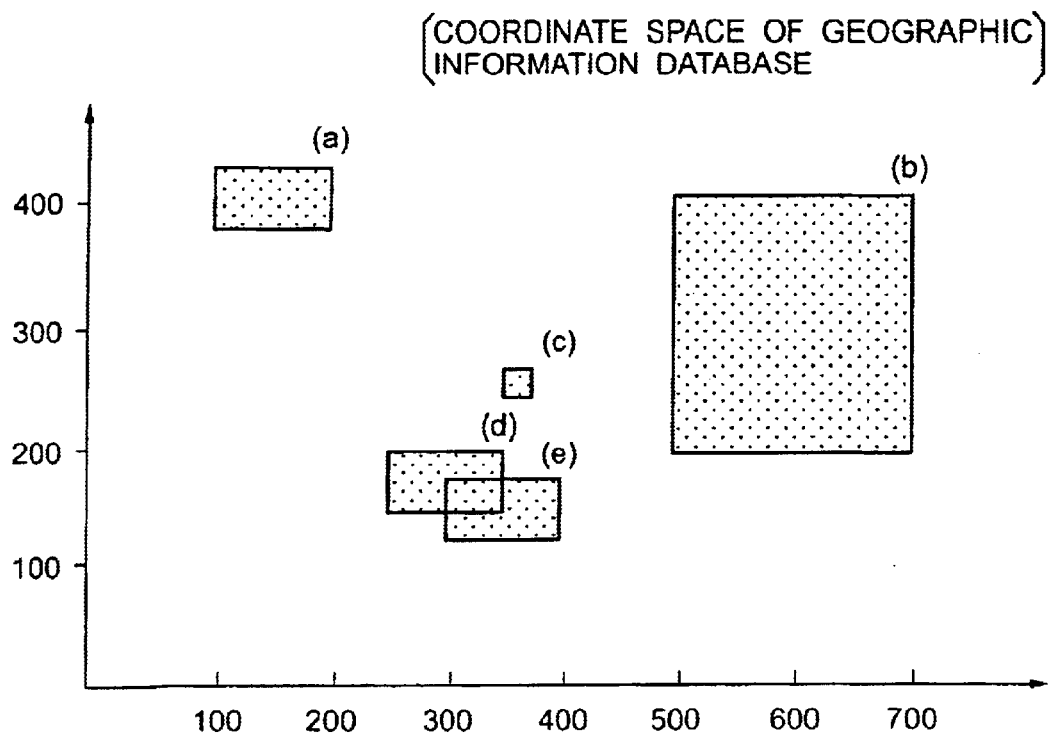
FIG. 4 is a drawing showing the meaning represented by the local database effective range information and its storage structure example.

The local database effective range information 13 holds the areas, the information in which obtained from the database server 2 is stored in the local database 16. These areas are held in local database effective range information 13 in the form shown in FIG. 4 by overlapping geographic rectangular ranges. In FIG. 4, the local database effective range information 13 represents the rectangular ranges used for the inquiry for the database server 2 by the lower left coordinates and upper right coordinates and holds a list of such rectangular ranges in the form of an effective range list. That is, rectangular ranges (a), (b), (c), (d) and (e) shown in FIG. 4, for example, are respectively represented by the lower left coordinates and upper right coordinates shown in the effective range list shown in FIG. 4.

As a result, it means that with respect to the area included in one or more rectangular ranges in the effective range list in the local database effective range information 13, the same data as that of the database server 2 is stored in the local database 16. On the contrary, it means that with respect to the area not included in any of rectangular ranges in the effective range list in the local database effective range information 13, the same data as that of the database server 2 is not stored in the local database 16. Hereinafter such area is referred to as an insufficient area in which data is not stored and insufficient in the local database 16.

The local database effective range check means 12 compares the rectangular range obtained from the screen display request input means 11 with the local database effective range information 13, and calculates the area which is insufficient in the local database 16. For example, the local database effective range check means 12 sequentially subtracts from the rectangular range obtained from the screen display request input means 11, rectangular ranges included in the effective range list in the local database effective range information 13.

As a result, the local database effective range check means 12 calculates the area remaining finally as an area which is insufficient in the local database 16. When there is no area remaining finally, it is found that the information in requested area is all included in the local database 16. The server-side database retrieval request means 14 requests the database server 2 to retrieve the geographic information existing in the area insufficient in the local database 16 which is obtained from the local database effective range check means 12 and expressed in the form of the rectangular range.

The database server 2 retrieves the geographic information included in the area requested by the client computer 1 from the master database 21, and returns the result thereof to the client computer 1 via the WWW server 3. When there is not the insufficient area which is insufficient in the local database 16, the server-side database retrieval request means 14 presents no request to the database server 2.

The database server 2 stores the information in the master database 21 in the same format as that of the records of the data stored in the local database 16 as shown in FIG. 3. It retrieves the records of components of the information included in the requested area in the master database 21 by the method indicated in "Japanese Patent Disclosure (Kokai) Hei 10-124528: Multidimensional data management method, multidimensional data management device, and medium for storing multidimensional data management program" (hereinafter referred to as the preceding art).

The local database update means 15 stores the information, that is the retrieval result, returned from the database server 2 in the local database 16, and also adds the rectangular range used for the inquiry for the database server 2 to the local database effective range information 13.

Then the local database retrieval means 17 retrieves the information included in the rectangular range requested by the screen display request input means 11 from the local database 16. The retrieval from the local database 16 is executed by the method indicated in the aforementioned preceding art, in the same way as the retrieval method in the database server 2. The screen display means 18 calls sequentially each element of the set of components obtained by the retrieval of the local database retrieval means 17 onto the screen by the aid of the drawing function, and thereby displays the set of components on the screen.

Hereinafter, further examples are explained with reference to FIGS. 4 and 4A. It is assumed that the local database effective range information 13 holds the areas (a)–(e) shown in FIG. 4 and the local database 16 stores the data in the areas (a)–(e) shown in FIG. 4.

Figure 4A:
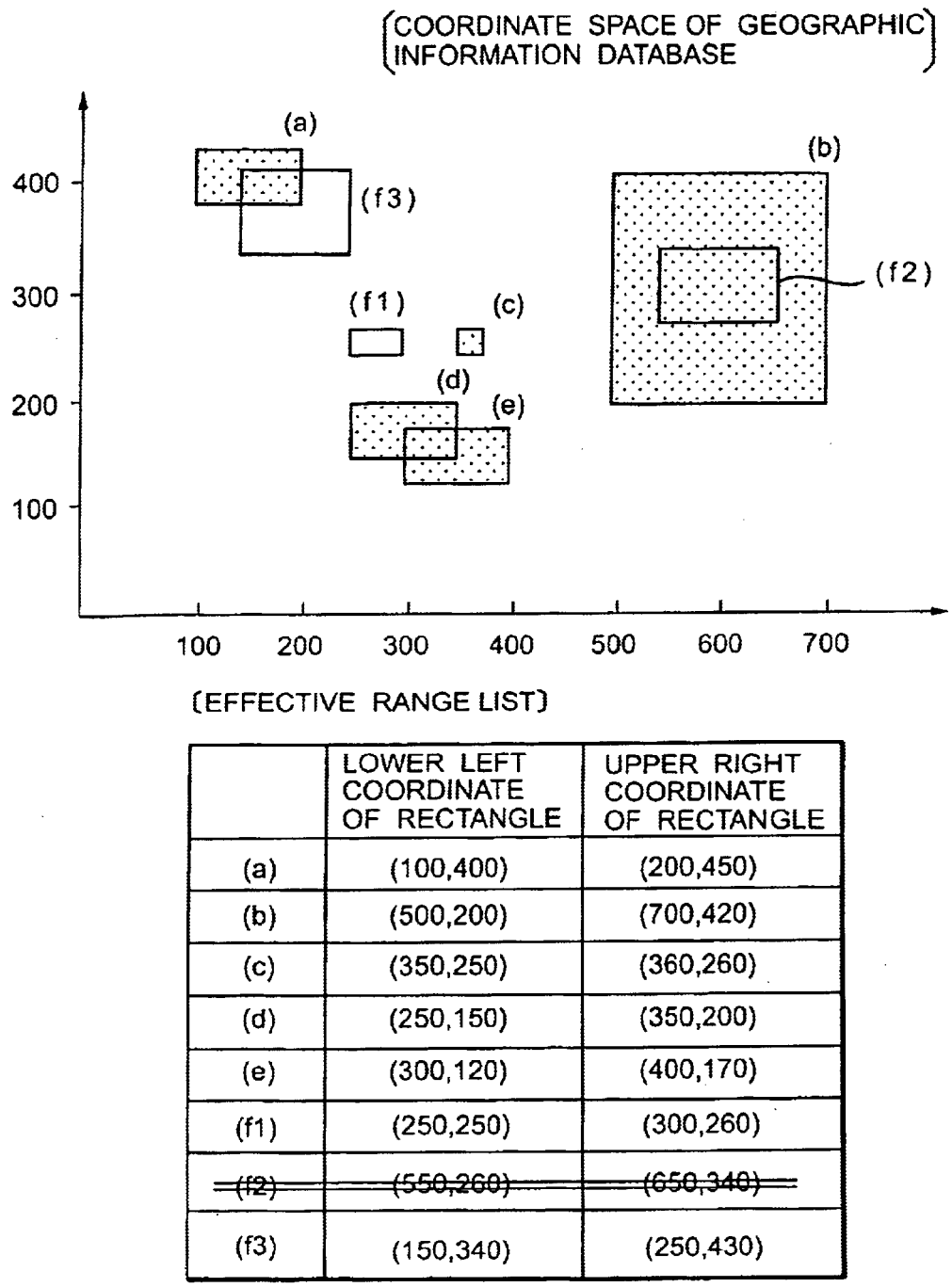
FIG. 4A is a drawing used for explaining the operation of the first embodiment.

In a first case, it is assumed that the screen display request input means 11 obtains a display request range in the form of a rectangular range (f1) shown in FIG. 4A. In this case, the rectangular range (f1) is not included in any of the areas (a)–(e) shown in FIG. 4A, and the rectangular range (f1) is determined as an insufficient area in which no data is stored and insufficient in the local database 16. Then the geographic information included in the rectangular range (f1) is obtained from the database server 2 and stored in the local database 16 by dividing the retrieved result into components. Furthermore, the rectangular range (f1) is stored in the local database effective range information 13 as shown in FIG. 4A.

In a second case, it is assumed that the screen display request input means 11 obtains a display request range in the form of a rectangular range (f2) shown in FIG. 4A. In this case, the rectangular range (f2) is completely included in the area (b) shown in FIG. 4A. As a result, there exists no insufficient area in the local database 16. It is therefore not necessary to request for the retrieval to the database server 2, and no data is added to the local database 16. Furthermore, the rectangular range (f2) is not stored in the database effective range information 13.

In a third case, it is assumed that the screen display request input means 11 obtains a display request range in the form of a rectangular range (f3) shown in FIG. 4A. In this case, a part of rectangular range (f3) is not included in any of the areas (a)–(e) shown in FIG. 4A, though the remaining part of the rectangular range (f3) is included in area (a). As a result, not the part of the rectangular range (f3) but all of the rectangular range (f3) is determined as an insufficient area.

Then the geographic information included not in the part of the rectangular range (f3) but in whole of the rectangular range (f3) is obtained from the database server 2, and the retrieved result is stored in the local database 16 by dividing the retrieved result into components. In this case, the retrieved result in the remaining part of the rectangular range (f3) is overwritten on the data in the rectangular area (a) already stored in the local database 16. As a result, the utilization factor of the local database 16 is increased. Furthermore, not the part of the rectangular range (f3) but the rectangular range (f3) itself is stored in the database effective range information 13 as shown in FIG. 4A.

Figure 2:
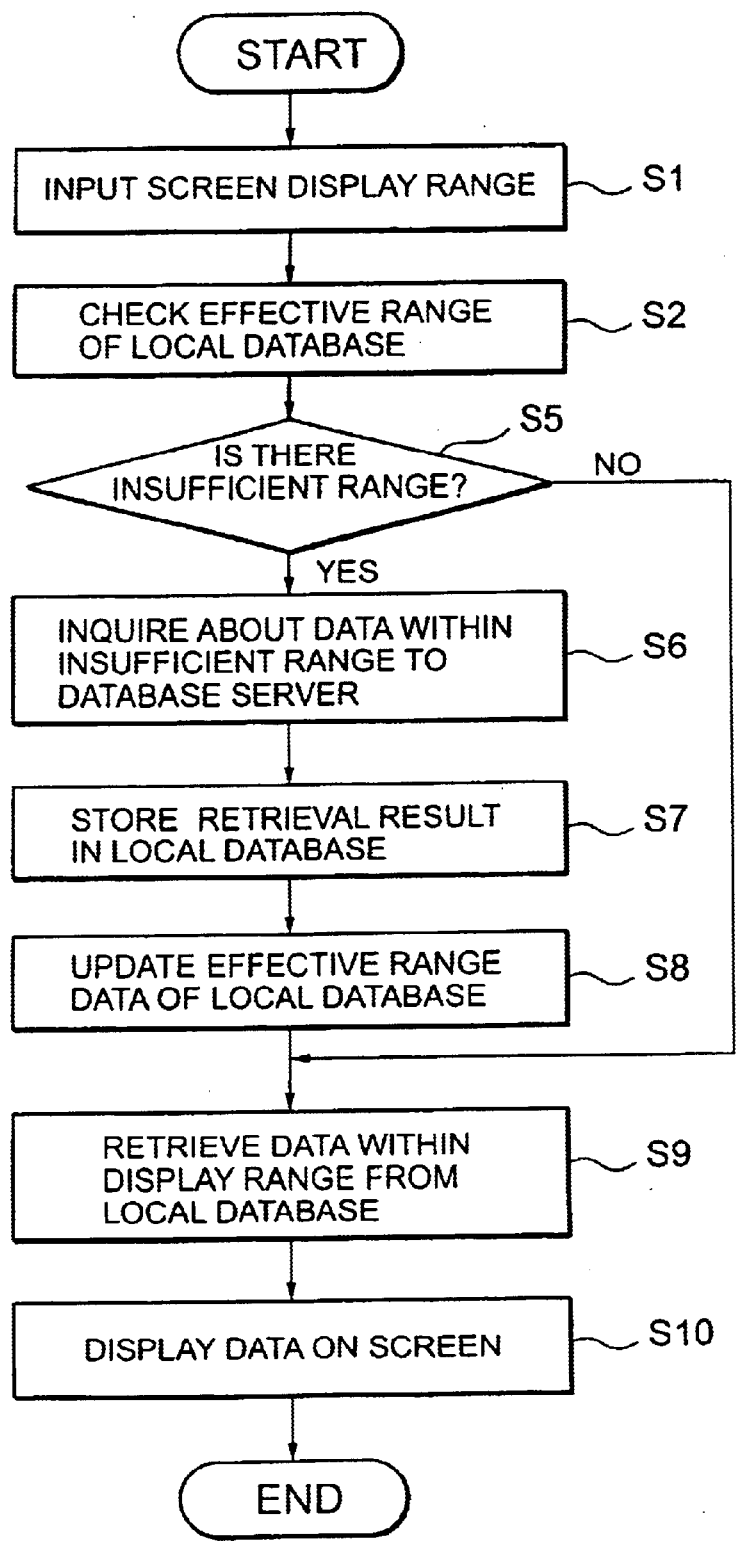
FIG. 2 is a flow chart showing the operation of the first embodiment shown in FIG. 1.

The operation of the present embodiment will be explained by referring to a flow chart shown in FIG. 2. Firstly, as shown in FIG. 2, the screen display request input means 11 obtains the geographic display request range in the form of the rectangular range which is requested by a user to be displayed (S1). Next, the local database effective range check means 12 compares the rectangular range obtained by the screen display request input means 11 with the local database effective range information 13.

As a result, the local database effective range check means 12 calculates the area which is insufficient in the local database 16 out of the rectangular range desired to be displayed by the user (S2). When there exists an insufficient range in the local database 16, the local database effective range check means 12 goes to a next step S6, and makes an inquiry to the database server 2. When there exists no insufficient range, the local database effective range check means 12 goes to a step S9 without executing steps S6 to S8 (S5).

When there exists an insufficient range which is insufficient in the local database 16 at the step S5, the server-side database retrieval request means 14 outputs a retrieval request of the geographic information included in the insufficient range to the database server 2 (S6). Next, the local database update means 15 divides the retrieval result returned from the database server 2 into components and stores them in the local database 16 (S7). The local database update means 15 adds the screen display range in the form of rectangular range obtained at step S1 to the local database effective range information 13 (S8).

Next, the local database retrieval means 17 retrieves the information of the screen display range from the local database 16 which is in the state that it stores all the information included in the screen display range obtained at the step S1 (S9) The result retrieved at the step S9 is displayed by the screen display means 18 (S10).

According to the first embodiment, since the components of the geographic information obtained as a result of the inquiry to the database server 2 are individually stored in the local database 16, there is no need to make an inquiry once again for the information included in the range inquired to the database server 2 in the past. As a result, the screen display time can be shortened.

Furthermore, according to the first embodiment, when a screen display request is made for the rectangular range overlapping with the rectangular range displayed in the past, the data overlapping with the data obtained in the past is overwritten in the local database 16. As a result, the utilization factor of the local database 16 is increased.

In the first embodiment as described above, the screen display request is inputted in the form of the rectangular range, and the retrieval from the database server is also made in the form of the rectangular range. When the processing in the geographical information indicator is executed in the form of the rectangular range, the speed of the calculation and the time required for the display can be shortened. But this invention is not limited to this embodiment. The processing in the geographical information indicator according to this invention can be executed in the form of any areas including the rectangular range in the above-described embodiment.

Embodiment 2

Next, a geographic information indicator according to a second embodiment of the present invention will be described below.

The hardware configuration of the second embodiment is the same as the configuration shown in FIG. 1. According to the first embodiment, when the attributes such as the color, line width, and the content of the character string of each component as shown in FIG. 3 are dynamically updated on the side of the database server 2, the data stored in the local database 16 does not always coincide with the data of the database server 2.

Therefore, the data with respect to the components having such attributes dynamically changing is necessary to be obtained every time from the database server 2 at the time of screen display. However, according to this embodiment, an inquiry is made only for the attribute data which may be dynamically updated to the database server 2 at the time of the screen display and the data is overwritten on the attributes of the records of the data stored in the local database 16.

Figure 6:
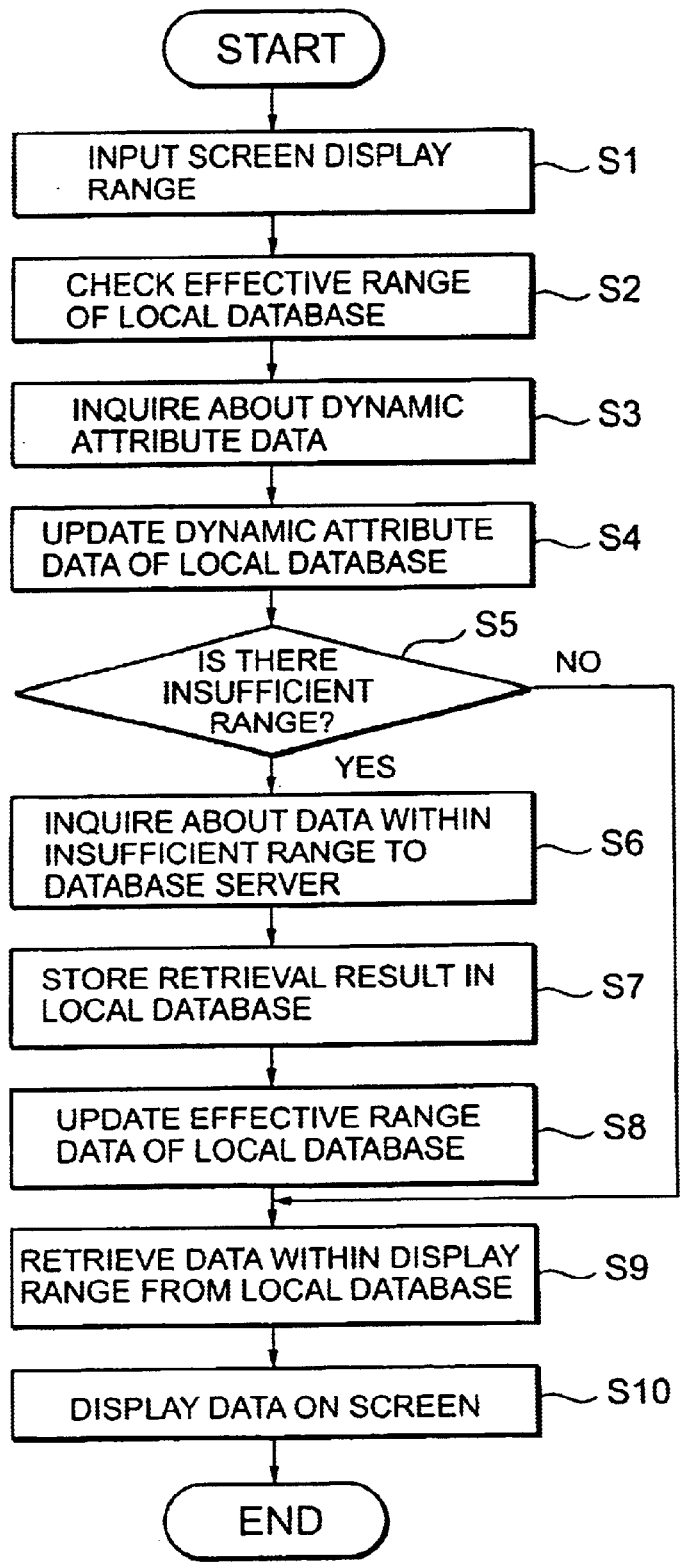
FIG. 6 is a flow chart showing the operation of a geographic information indicator according to a second embodiment of the present invention.

The operation of the present embodiment will be explained by referring to a flow chart shown in FIG. 6. Firstly, as shown in FIG. 6, the screen display request input means 11 obtains the geographic display request range in the form of the rectangular range which is requested by a user to be displayed (S1). Next, the local database effective range check means 12 compares the rectangular range obtained by the screen display request input means 11 with the local database effective range information 13. As a result, the local database effective range check means 12 calculates an area which is insufficient in the local database 16 and an area in which the data of the local database 16 can be used, out of the rectangular range desired to be displayed by the user (S2).

Next, the local database effective range check means 12 inquires the database server 2 with respect to the preset attributes among the data included within the area in which the local database 16 can be used (S3). In this case, the inquiry is made not with respect to such area in which the local database 16 can be used but with respect to the rectangular range requested by the user to be displayed. Next, according to the attribute data returned from the database server 2, the local database effective range check means 12 updates the attributes of the data stored in the local database 16 (S4).

Next, as a result of the step S2, when there exists an insufficient range in the local database 16, the local database effective range check means 12 goes to the next step S6, and makes an inquiry to the database server 2. When there exists no insufficient range, the local database effective range check means 12 goes to the step S9 without executing the steps S6 to S8 (S5). When there exists the range which is insufficient in the local database 16 at the step S5, the server-side database retrieval request means 14 outputs the retrieval request of the geographic information included in the insufficient range to the database server 2 (S6).

Next, the local database update means 15 divides the retrieval result returned from the database server 2 into components and stores them in the local database 16 (S7). The local database update means 15 adds the screen display range in the form of rectangular range obtained at the step S1 to the local database effective range information 13 (S8). Next, the local database retrieval means 17 retrieves the information of the screen display range from the local database 16 which is in the state that it stores all the information included in the screen display range obtained at the step S1 (S9). The result retrieved at the step S9 is displayed by the screen display means 18 (S10).

According to the second embodiment, for the data of the facilities having dynamically changing attributes, it is necessary to make an inquiry to the database server 2 every time at the time of the display. However, in this embodiment, since only the dynamically changing attributes are inquired, the transfer amount of the retrieval result from the database server 2 can be reduced.

Embodiment 3

Next, a geographic information indicator according to a third embodiment of the present invention will be described below.

The hardware configuration of the third embodiment is the same as the configuration shown in FIG. 1. According to the second embodiment, when the attributes such as the color, the line width, and the content of the character string of each component as shown in FIG. 3 are dynamically updated on the side of the database server 2, though only a part of attributes can be limited to, it is necessary to obtain attribute data from the database server 2 every time at the time of the screen display.

However, according to this embodiment, an inquiry is made with respect to attribute data which may be dynamically updated to the database server 2 asynchronously with the screen display request, and the updated data is asynchronously overwritten on the attributes of the records of the data stored in the local database 16.

The operation of the present invention will be explained by referring to a flow chart shown in FIG. 7. Firstly, the flow of the process at the time of the screen display shown in a flow chart F1 in FIG. 7 will be explained.

Figure 7:
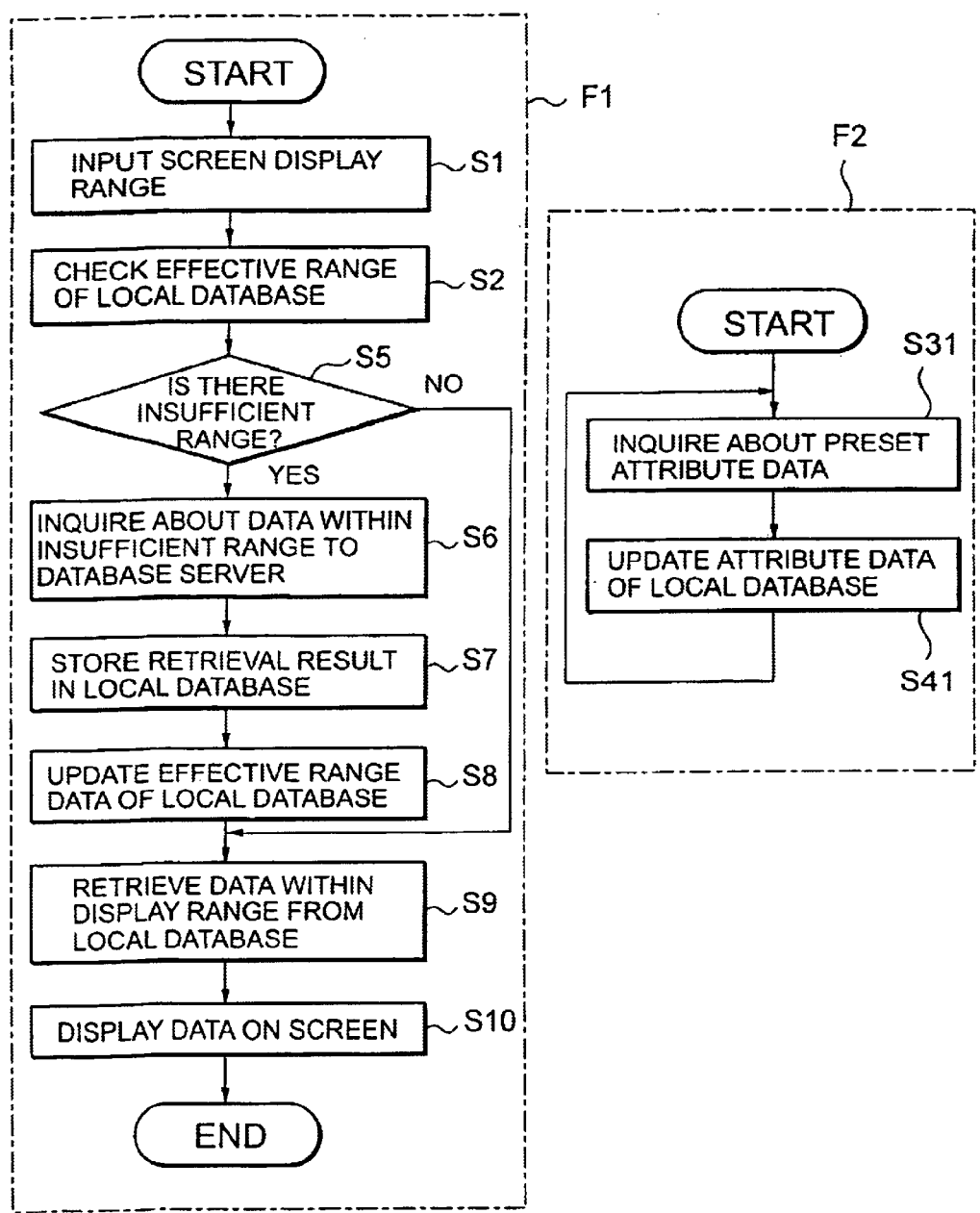
FIG. 7 is a flow chart showing the operation of a geographic information indicator according to a third embodiment of the present invention.

Firstly, as shown in FIG. 7, the screen display request input means 11 obtains the geographic display request range in the form of the rectangular range which is requested by the user to be displayed (S1).

Next, the local database effective range check means 12 compares the rectangular range obtained by the screen display request input means 11 with the local database effective range information 13. As a result, the local database effective range check means 12 calculates the area which is insufficient in the local database 16 out of the rectangular range desired to be displayed by the user (S2).

When there exists an insufficient range in the local database 16, the local database effective range check means 12 goes to the next step S6, and makes an inquiry to the database server 2. When there exists no insufficient range, the local database effective range check means 12 goes to the step S9 without executing the steps S6 to S8 (S5). When there exists a range which is insufficient in the local database 16 at the step S5, the server-side database retrieval request means 14 outputs a retrieval request of the geographic information included in the insufficient range to the database server 2 (S6).

Next, the local database update means 15 divides the retrieval result returned from the database server 2 into components and stores them in the local database 16 (S7). The local database update means 15 adds the screen display range in the form of rectangular range obtained at the step S1 to the local database effective range information 13 (S8). Next, the local database retrieval means 17 retrieves the information of the screen display range from the local database 16 which is in the state that it stores all the information included in the screen display range obtained at the step S1 (S9). The result retrieved at the step S9 is displayed by the screen display means 18 (S10).

Next, the asynchronously updating the attribute data shown in a flow chart F2 in FIG. 7 will be explained. With respect to the data stored in the local database 16, an inquiry is made with respect to the preset attribute data to the database server 2 (S31). Next, using the retrieval result, the attributes of the data stored in the local database 16 are overwritten (S41). The processes at the steps S31 and S41 are repeatedly executed asynchronously with the screen display request.

According to the third embodiment, for the data of the facilities having dynamically changing attributes, an inquiry is made with respect to the attribute data to the database server 2 asynchronously with the screen display request, and the attribute data of the local database 16 is updated. As a result, the transfer amount of the retrieval result from the database server 2 can be reduced. In addition, an inquiry with respect to the attribute data at the time of the screen display is unnecessary, and hence the processing time for the screen display request can be shortened.

Embodiment 4

Figure 8:
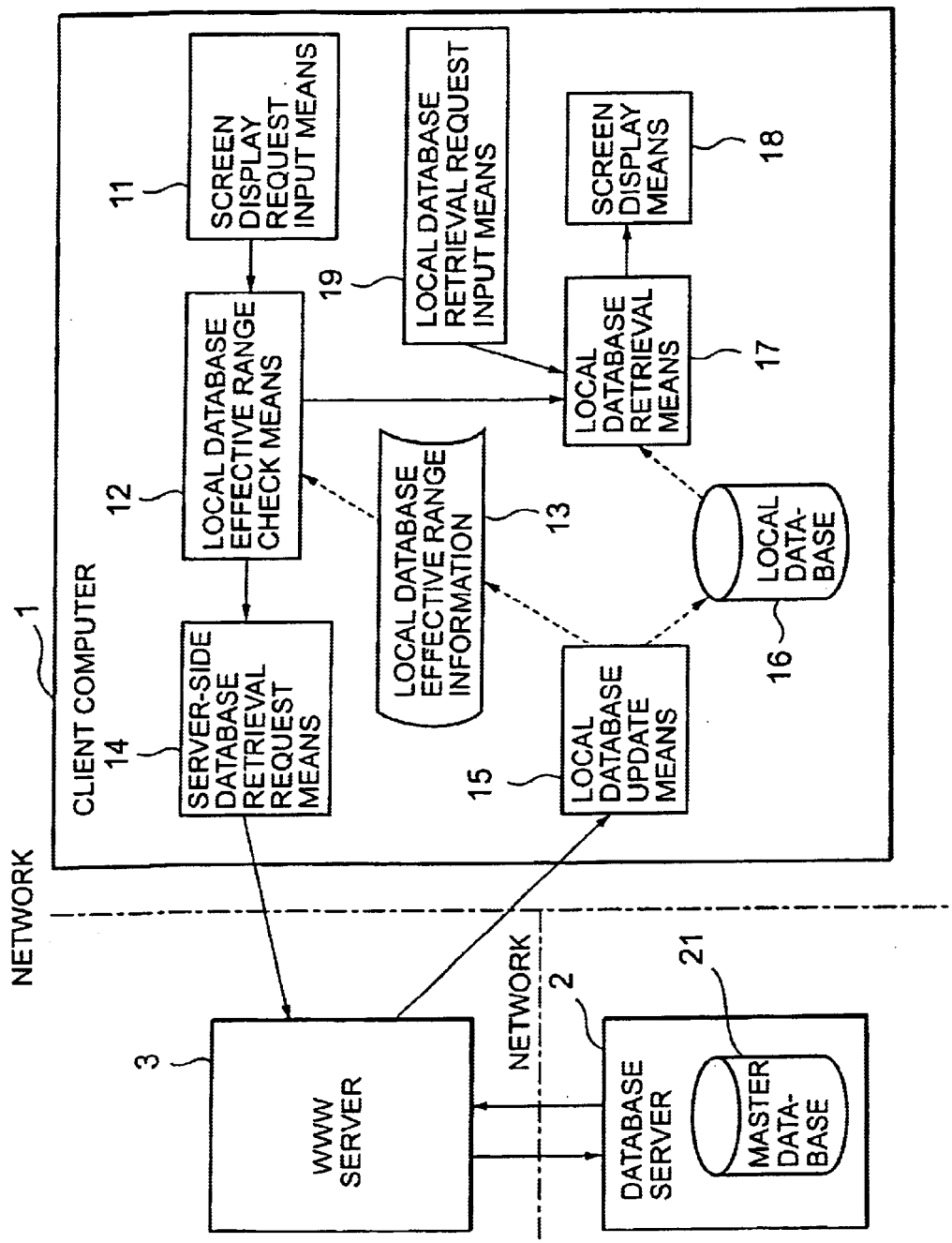
FIG. 8 is a block diagram of a geographic information indicator according to a fourth embodiment of the present invention.

FIG. 8 is a block diagram of a geographic information indicator according to a fourth embodiment of the present invention. In FIG. 8, the same numeral is assigned to each of the parts having the same functions as those shown in FIG. 1 and the explanation thereof will be omitted. The characteristic point of this embodiment in the construction is that a local database retrieval request input means 19 is further provided. The others are the same as those shown in FIG. 1.

According to the first embodiment, the local database retrieval means 17 retrieves the data necessary for the screen display in the rectangular range of the display from the data stored in the local database 16. However, in this embodiment, by providing further an optional retrieval request input means for the local database 16 and a local database retrieval function for the input retrieval request, the local database 16 can also be used for the retrieval other than the rectangle retrieval for the screen display.

The local database retrieval request input means 19 inputs a request for the retrieval of components of the geographic information displayed on the screen which is nearest to the coordinates inputted by a user, or a request for the retrieval of data having a specific key value. The local database retrieval means 17 retrieves the information included in the rectangular range obtained from the screen display request input means 11 from the local database 16, and also retrieves the local database 16 based on a retrieval request from the local database retrieval request input means 19. The components of geographic information displayed on the screen which is nearest to the coordinates inputted by the user are retrieved by the preceding art.

This embodiment displays the data on the screen in the same way as the first embodiment. In addition, in the state that the data of the components of the geographic information displayed on the screen is stored in the local database 16, the retrieval request inputted from the local database retrieval request input means 19 is retrieved for the local database 16 by the local database retrieval means 17. The retrieval result of the local database retrieval means 17 is displayed by the screen display means 18.

According to the fourth embodiment, the local database 16 can be used for an inquiry in a different format from that of the retrieval with the rectangular range designated for the database server 2 as in the first embodiment. That is, the local database retrieval means 17 can retrieve the data stored in the local database 16 not only with respect to the rectangular range stored in the local database effective range information 13 but also with respect to an optional area of the local database 16. Accordingly, there is no need to retrieve for the database server 2 for such inquiry, and hence the data retrieval time can be shortened.

Embodiment 5

Figure 9:
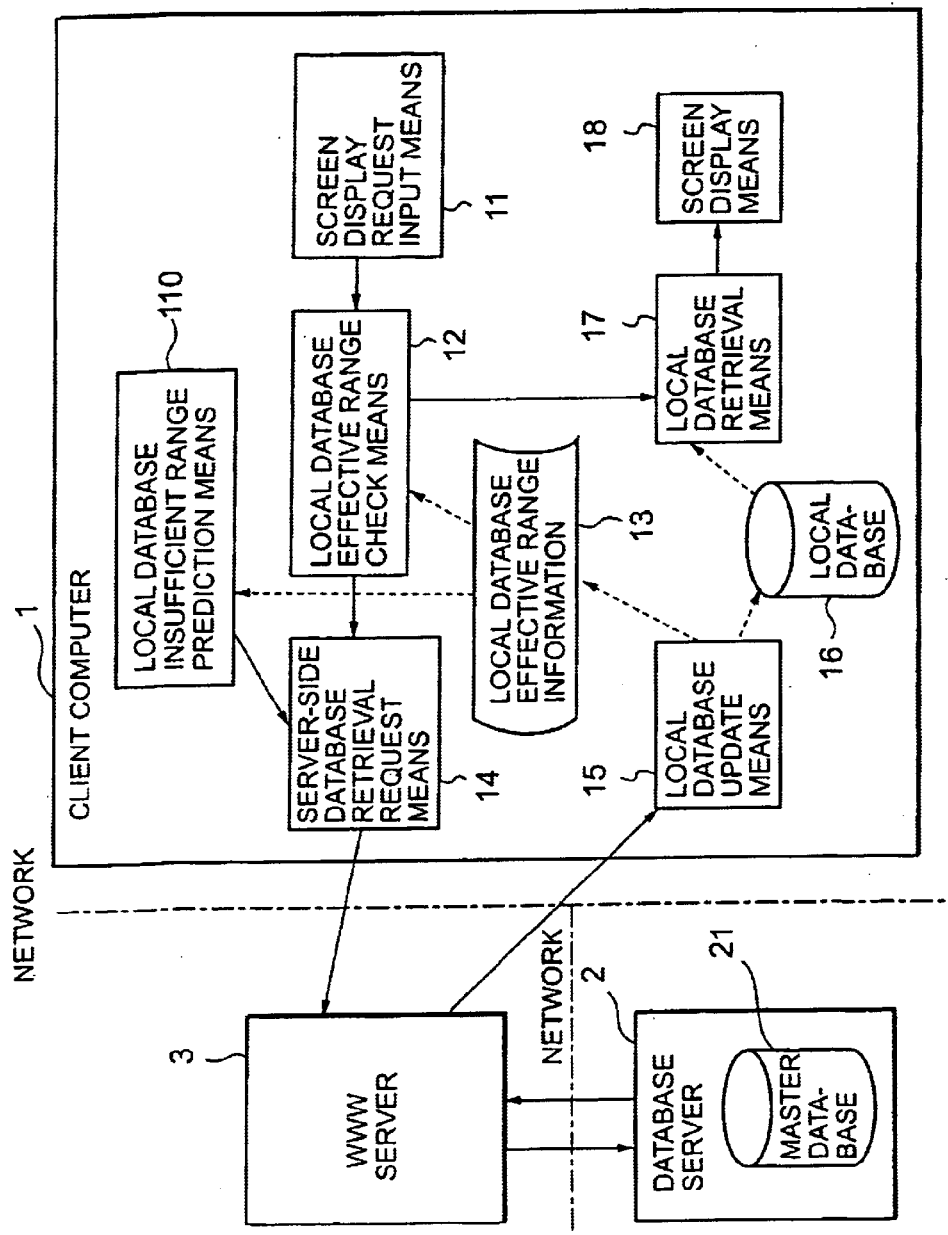
FIG. 9 is a block diagram of a geographic information indicator according to a fifth embodiment of the present invention.

FIG. 9 is a block diagram of a geographic information indicator according to a fifth embodiment of the present invention. In FIG. 9, the same numeral is assigned to each of the parts having the same functions as those shown in FIG. 1 and the explanation thereof will be omitted. The characteristic point of this embodiment in the construction is that a local database insufficient range prediction means 110 is further provided. The other parts of the construction are the same as those shown in FIG. 1.

In the first embodiment, after inputting the screen display request, an inquiry is made to the database server 2 with respect to an area which is insufficient in the local database 16, if such area exists. However, according to this embodiment, since a means for predicting a range in the local database 16 which is assumed to be insufficient at the time of the next display request asynchronously with the screen display process is further provided. Accordingly, the data in the necessary range is retrieved from the database server 2 before the next screen display request is input and it can be stored in the local database 16 in advance.

When there is any area found among upper, lower, left, right, upper left, lower left, upper right, and lower right areas of the range displayed on the screen at present which is not included in the local database effective range information 13, the local database insufficient range prediction means 110 inquires with respect to the such areas sequentially for the database server 2 via the server-side data base retrieval request means 14. In this embodiment, the shape and size of the rectangular ranges of any of the upper, lower, left, right, upper left, lower left, upper right, and lower right areas are determined the same as the rectangular range displayed on the screen at present. But the shape and size thereof may be determined different from the rectangular range displayed on the screen at present. Furthermore, if an insufficient range exist, an inquiry is made to the database server 2 with respect to the rectangular range of the area corresponding to the insufficient range.

This embodiment displays the data on the screen in the same way as the first embodiment. Furthermore, a retrieval request is output for the database server 2 from the local database insufficient range prediction means 110 via the server-side database retrieval request means 14 asynchronously before the next screen display request is input.

The retrieval result returned from the database server 2 is stored in the local database 16 by the local database update means 15 in the same way as in the first embodiment, and also the rectangular range used for the retrieval of the database server 2 is added to the local database effective range information 13.

According to the fifth embodiment, the range which is assumed to be necessary in the next display request is predicted before a next screen display request is input, and the necessary data is retrieved from the database server 2 and stored in the local database 16 in advance. Accordingly, the possibility of inquiring the database server 12 at the time of the next screen display request is reduced, and the meantime required for the screen display can be shortened.

Embodiment 6

Figure 10:
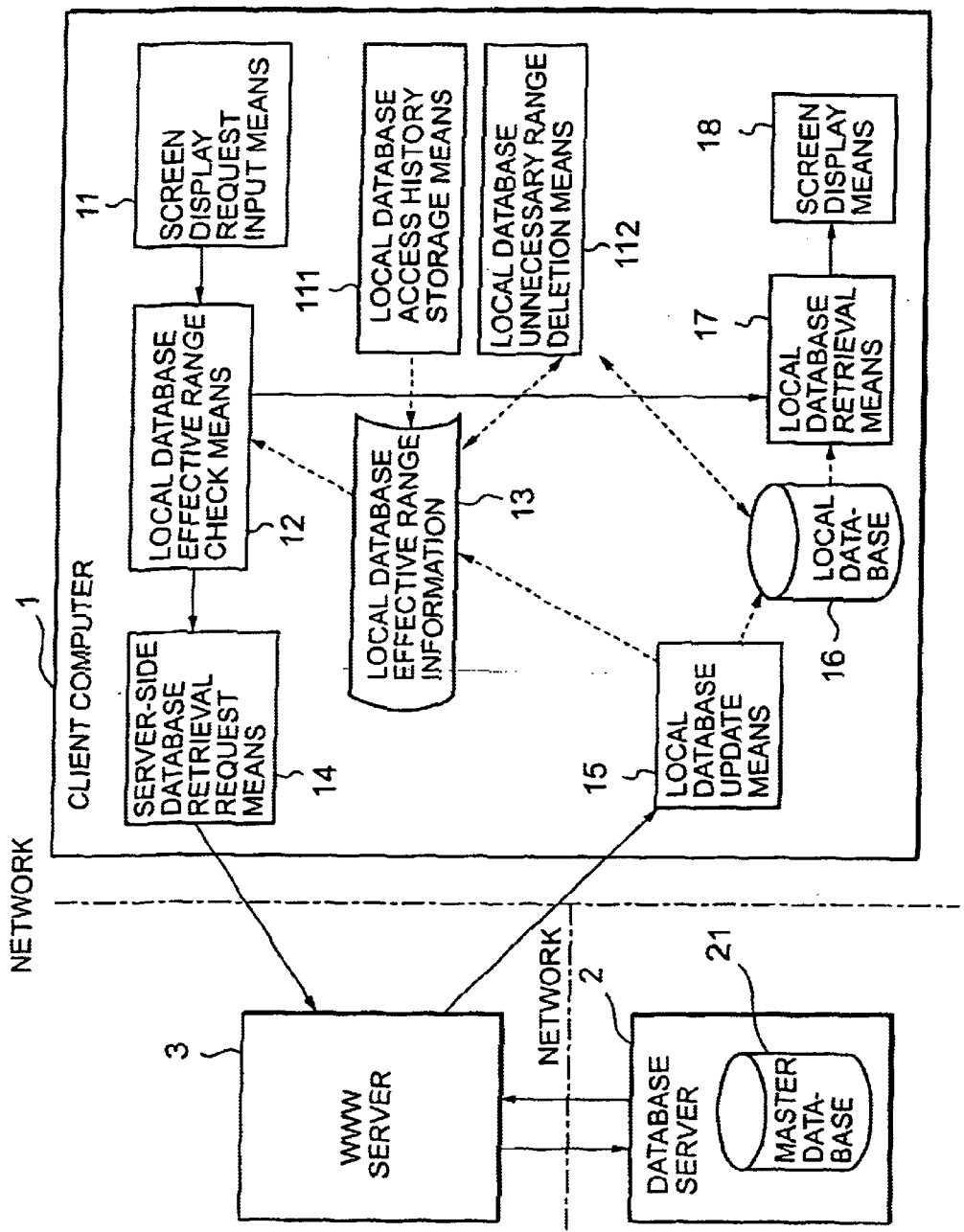
FIG. 10 is a block diagram of a geographic information indicator according to a sixth embodiment of the present invention.

FIG. 10 is a block diagram of a geographic information indicator according to a sixth embodiment of the present invention. In FIG. 10, the same numeral is assigned to each of the parts having the same functions as those shown in FIG. 1 and the explanation thereof will be omitted. The characteristic point of this embodiment in the construction is that a local database access history storage means 111 and a local database unnecessary range deletion means 112 are further provided. The other parts of the construction are the same as those shown in FIG. 1.

The first embodiment is provided with the means for adding the data obtained from the database server 2 sequentially to the local database 16. In this embodiment, the local database unnecessary range deletion means 112 for deleting the data in the local database 16 whose reference frequency is reduced from the local database 16 and the local database access history storage means 111 are added to the first embodiment. As a result, the storage capacity of the local database 16 can be suppressed to an appropriate size.

Figure 11:
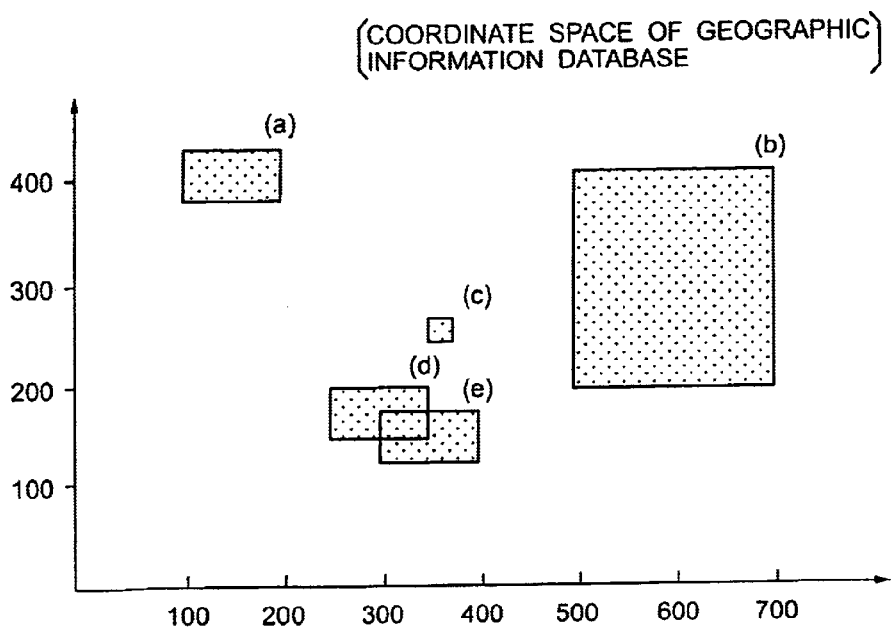
FIG. 11 is a drawing showing a storage structure example of the local database effective range information and the local database access history.

The local database access history storage means 111 functions to store the past access states to the local database 16 by the screen display requests as described below. In the local database effective range information 13, a last reference time column for each rectangular range is provided in the effective range list as shown in FIG. 11. The last reference time in the row of the rectangular range intersecting the rectangular range requested at the time of screen display is updated by the present time. By doing this, the rectangular range which is not referred to for the longest time can be obtained from the effective range list in the local database effective range information 13.

The local database unnecessary range deletion means 112 deletes the data which is least required in the local database 16 based on the information in the effective range list in the local database effective range information 13 prepared by the local database access history storage means 111. For example, the local database unnecessary range deletion means 112 retrieves the data included in the rectangular range which has not been referred to for the longest time in the effective range list of the local database effective range information 13 using the local database retrieval means 17.

Then, when the obtained data is not included in any other rectangular range included in the effective range list, the local database unnecessary range deletion means 112 deletes such data from the local database 16. The local database unnecessary range deletion means 112 also deletes the rectangular range corresponding to such data from the effective range list of the local database effective range information 13.

Figure 12:
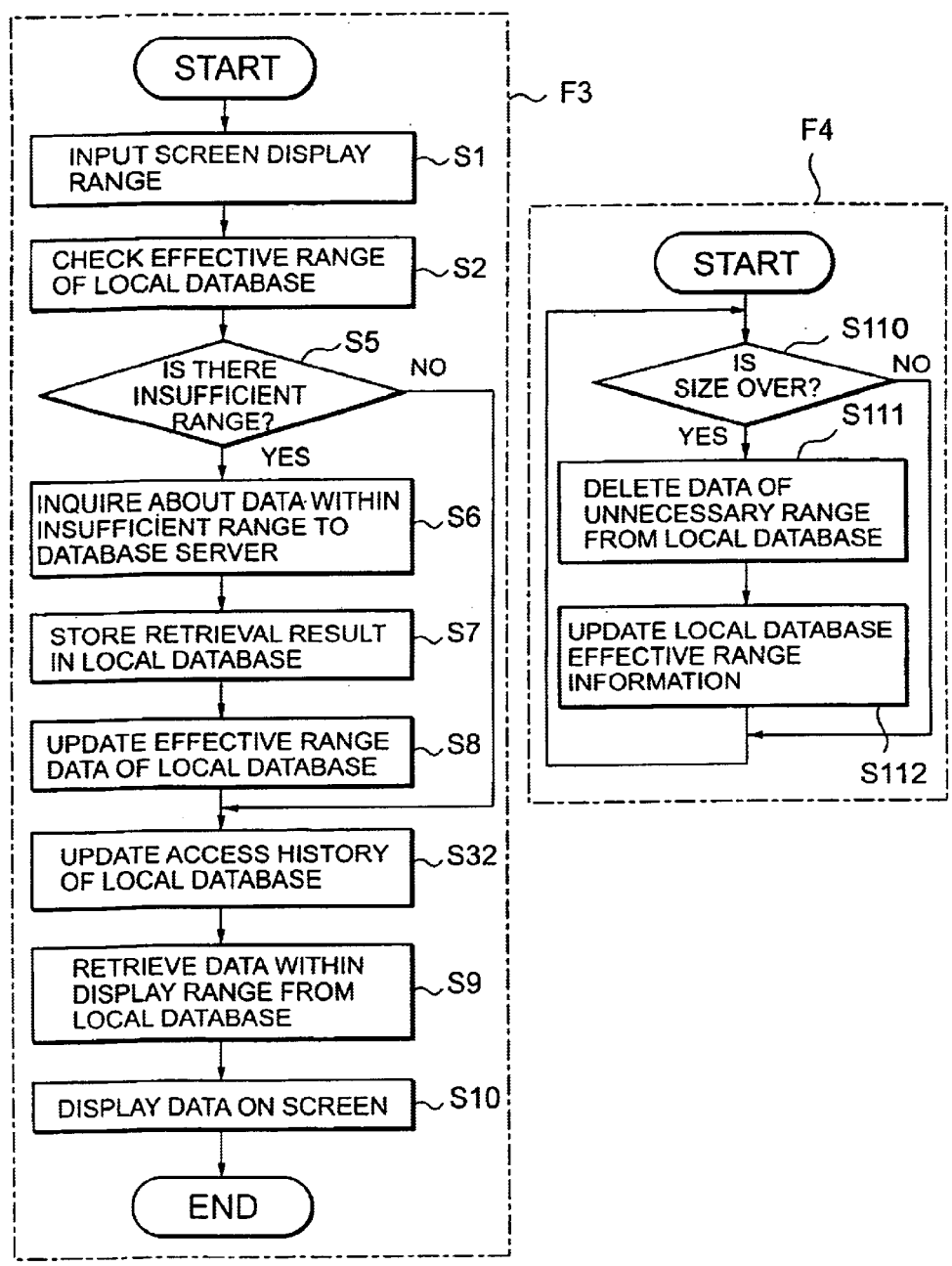
FIG. 12 is a flow chart showing the operation of the sixth embodiment shown in FIG. 10.

The operation of the present embodiment will be explained by referring to a flow chart shown in FIG. 12. Firstly, the process at the time of the screen display shown in a flow chart F3 in FIG. 12 will be explained. With respect to the screen display process, as shown in FIG. 12, the screen display request input means 11 obtains the geographic display request range in the form of the rectangular range which is requested by a user to be displayed (S1).

Next, the local database effective range check means 12 compares the rectangular range obtained by the screen display request input means 11 with the local database effective range information 13. As a result, the local database effective range check means 12 calculates an area which is insufficient in the local database 16 and an area in which the data of the local database 16 can be used, out of the rectangular range desired to be displayed by the user (S2).

Next, as a result of the step S2, when there exists an insufficient range in the local database 16, the local database effective range check means 12 goes to the next step S6, and makes an inquiry to the database server 2. When there exists no insufficient range, the local database effective range check means 12 goes to a step S32 without executing the steps S6 to S8 (S5).

The local database access history storage means 111, when the range for using the local database which is obtained at the step S2 intersects any of the rectangular ranges in the effective range list of the local database effective range information 13, sets the present time in the last reference time column of the corresponding rectangular range (S32).

Next, when there exists the range which is insufficient in the local database 16 at the step S5, the server-side database retrieval request means 14 outputs the retrieval request of the geographic information included in the insufficient range to the database server 2 (S6).

Next, the local database update means 15 divides the retrieval result returned from the database server 2 into components, that is, a set of broken lines showing roads and the structures of buildings, character strings on a map, and symbols of facilities arranged on the map, and stores them in the local database 16 (S7). The local database update means 15 adds the screen display range in the form of rectangular range obtained at the step S1 to the local database effective range information 13 (S8).

Next, the local database access history storage means 111 sets the present time in the last reference time column of the screen display range now added to the effective range list of the local database effective range information 13 (S32).

Next, the local database retrieval means 17 retrieves the information of the screen display range from the local database 16 which is in the state that it stores all the information included in the screen display range obtained at the step S1 (S9). The result retrieved at the step S9 is displayed by the screen display means 18 (S10).

Next, with respect to a flow chart F4 in FIG. 12, the deletion of the local database unnecessary range executed asynchronously with the screen display request will be explained. Firstly, it is checked whether or not the storage capacity used by the local database 16 at the present time is more than a preset size (S110). When the storage capacity is not more than the preset size, nothing is done.

But, when the used storage capacity is more than the preset size, the local database unnecessary range deletion means 112 deletes the data which is least required in the local database 16 based on the information in the effective range list prepared by the local database access history storage means 111, as described above in details. The local database unnecessary range deletion means 112 also deletes the rectangular range corresponding to such data from the effective range list of the local database effective range information 13.

According to the sixth embodiment, the date stored in the local database 16 can be deleted as required, the storage capacity of the local database 16 can be maintained within an appropriate range. By doing this, this embodiment can be applied to even a client computer having a limited storage capacity.

Embodiment 7

Figure 13:
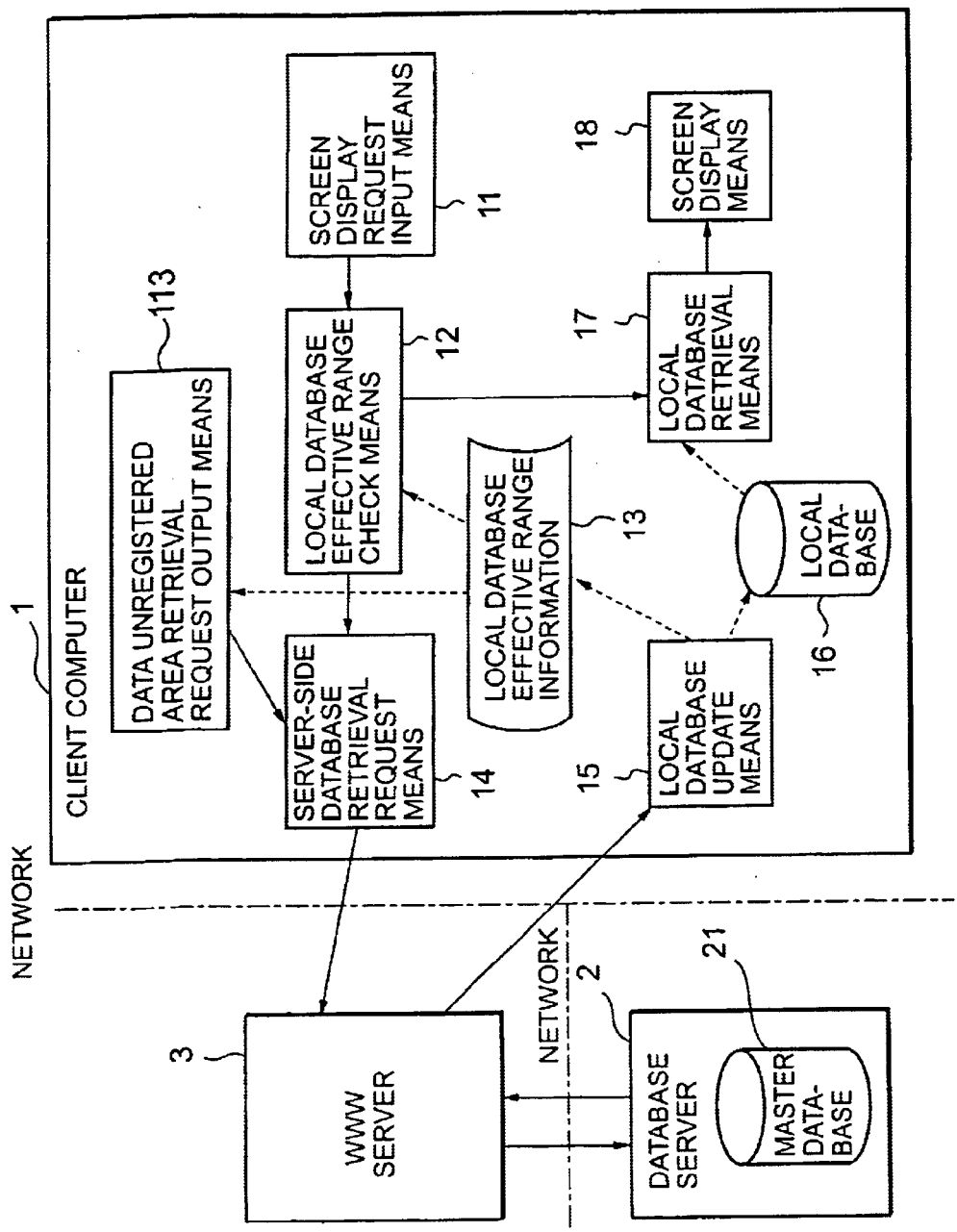
FIG. 13 is a block diagram of a geographic information indicator according to a seventh embodiment of the present invention.

FIG. 13 is a block diagram of a geographic information indicator according to a seventh embodiment of the present invention. In FIG. 13, the same numeral is assigned to each of the parts having the same functions as those shown in FIG. 1 and the explanation thereof will be omitted. The characteristic point of this embodiment in the construction is that a data unregistered area retrieval request output means 113 is further provided. The other parts of the construction are the same as those shown in FIG. 1.

The data unregistered area retrieval request output means 113 prepares an inquiry to retrieve a data unregistered area, that is, an area of the master database 21 of the database server 2 where no data is registered in the present time, and sends it to the server-side database retrieval request means 14. The process flow at the time of the screen display is the same as that of the first embodiment. But when a client computer is started, the data unregistered area retrieval request output means 113 outputs a data unregistered area retrieval request firstly to database server 2 through the server-side database retrieval request means 14. Based on the retrieval result, the local database update means 15 adds the data unregistered area to the local database effective range information 13.

According to the seventh embodiment, the area of the master database 21 of the database server 2 where no data is registered in the present time is added to the local database effective range information 13 beforehand. Accordingly, an inquiry with respect to the data unregistered area to the database server 2 can be deleted at the time of the screen display, and as a result meaningless inquiries to the database server 2 can be reduced.

Embodiment 8

Next, a geographic information indicator according to an eighth embodiment of the present invention will be described below. FIG. 8 is a flow chart showing the detailed process of the eighth embodiment. The hardware configuration of this embodiment is the same as that shown in FIG. 1, so that the explanation thereof will be omitted. According to the first embodiment, while an inquiry is made to the database server 2, none of the requested information is displayed on the screen.

However, according to this embodiment, before an inquiry is made to the database server 2, firstly the data is displayed on the screen within the data range registered in the local database 16. Then an inquiry is made to the database server 2, and the data in the range, which is insufficient in the local database 16, is displayed later based on the retrieval result.

Figure 14:
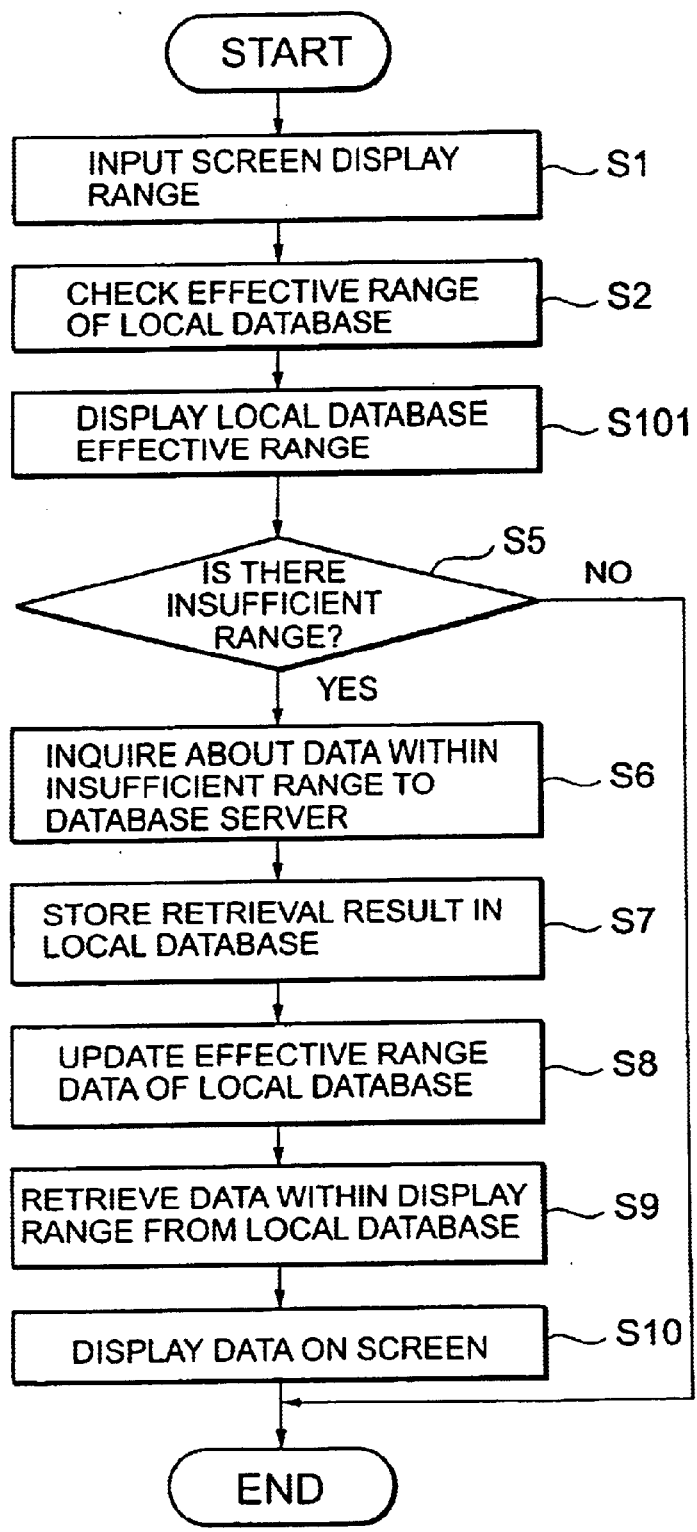
FIG. 14 is a flow chart showing the operation of a geographic information indicator according to an eighth embodiment of the present invention.

The operation of the present embodiment will be explained by referring to the flow chart shown in FIG. 14. Firstly, as shown in FIG. 14, the screen display request input means 11 obtains the geographic display request range in the form of the rectangular range which is requested by a user to be displayed (S1).

Next, the local database effective range check means 12 compares the rectangular range obtained by the screen display request input means 11 with the local database effective range information 13. As a result, the local database effective range check means 12 calculates an area which is insufficient in the local database 16 and an area in which the data of the local database 16 can be used, out of the rectangular range desired to be displayed by the user (S2).

Next, with respect to the area in which the data of the local database 16 can be used, the local database retrieval means 17 retrieves the data stored in the local database 16, and the retrieval result is displayed on the screen by the screen display means 18 (S101).

Next, as a result of the step S2, when there exists an insufficient range in the local database 16, the local database effective range check means 12 goes to the next step S6, and makes an inquiry to the database server 2. When there exists no insufficient range, the local database effective range check means 12 finishes the operation without executing the steps S6 to S10 (S5). When there exist the range which is insufficient in the local database 16 at the step S5, the server-side database retrieval request means 14 outputs the retrieval request of the geographic information included in the insufficient range to the database server 2 (S6).

Next, the local database update means 15 divides the retrieval result returned from the database server 2 into components, that is, a set of broken lines showing roads and the structures of buildings, character strings on a map, and symbols of facilities arranged on the map, and stores them in the local database 16 (S7). The local database update means 15 adds the screen display range in the form of rectangular range obtained at the step S1 to the local database effective range information 13 (S8).

Next, the local database retrieval means 17 retrieves the information of the screen display range from the local database 16 which is in the state that it stores all the information included in the screen display range obtained at the step S1 (S9). The result retrieved at the step S9 is displayed by the screen display means 18 (S10).

According to the eighth embodiment, with respect to the area in which the data of the local database 16 can be used, the data stored in the local database 16 can be displayed on the screen earlier. As a result, the information can be supplied to a user earlier as much as possible, and the responsibility of the screen display to the user can be improved.

Embodiment 9

Figure 15:
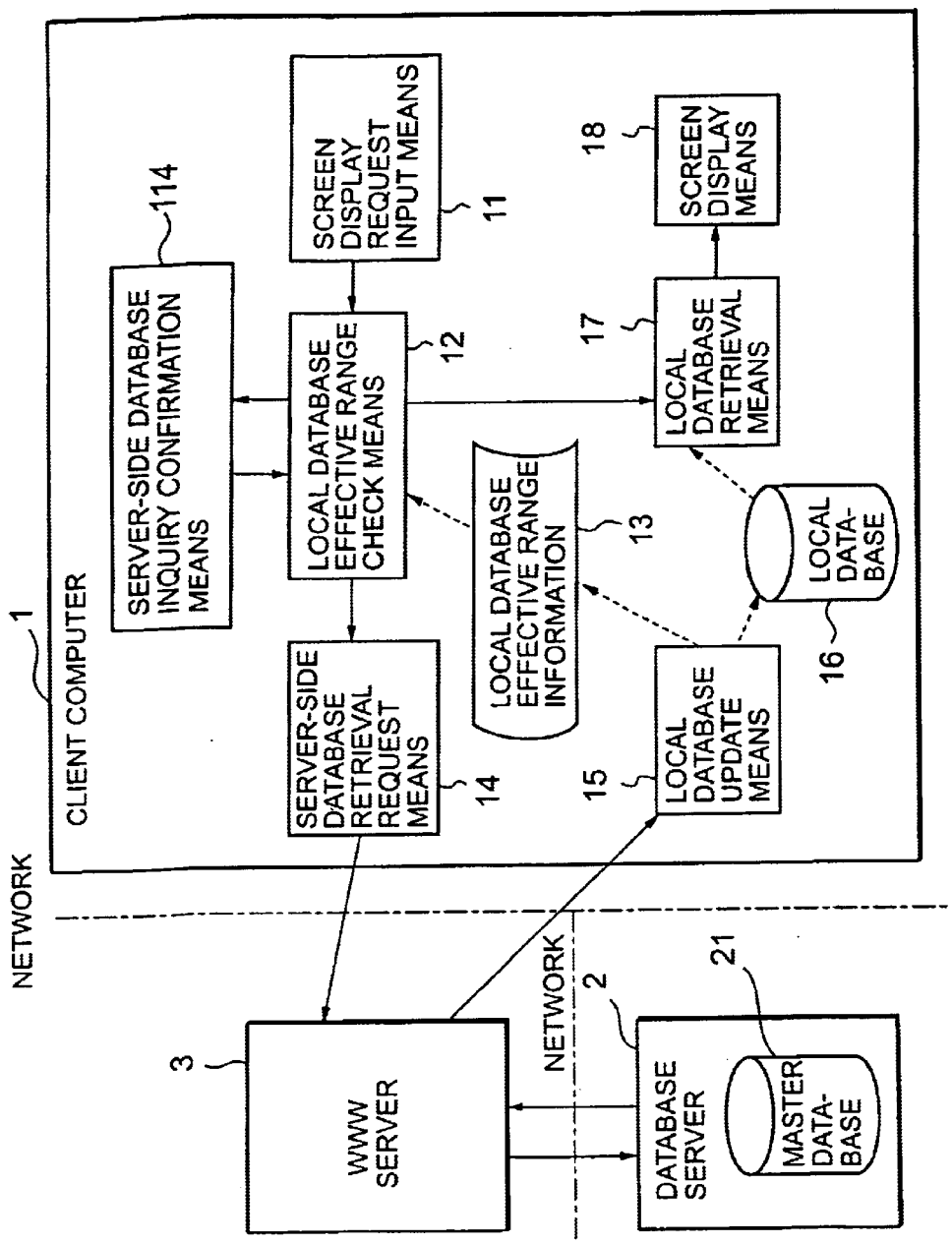
FIG. 15 is a block diagram of a geographic information indicator according to a ninth embodiment of the present invention.

FIG. 15 is a block diagram of a geographic information indicator according to a ninth embodiment of the present invention. In FIG. 15, the same numeral is assigned to each of the parts having the same functions as those shown in FIG. 1 and the explanation thereof will be omitted. The characteristic point of this embodiment in the construction is that a server-side database inquiry confirmation means 114 is further provided. The other parts of the construction are the same as those shown in FIG. 1.

When there is an insufficient area in the local database 16, the server-side database inquiry confirmation means 114 confirms a user whether or not to inquire the data in the insufficient area to the database server 2 and receives an answer from the user.

Figure 16:
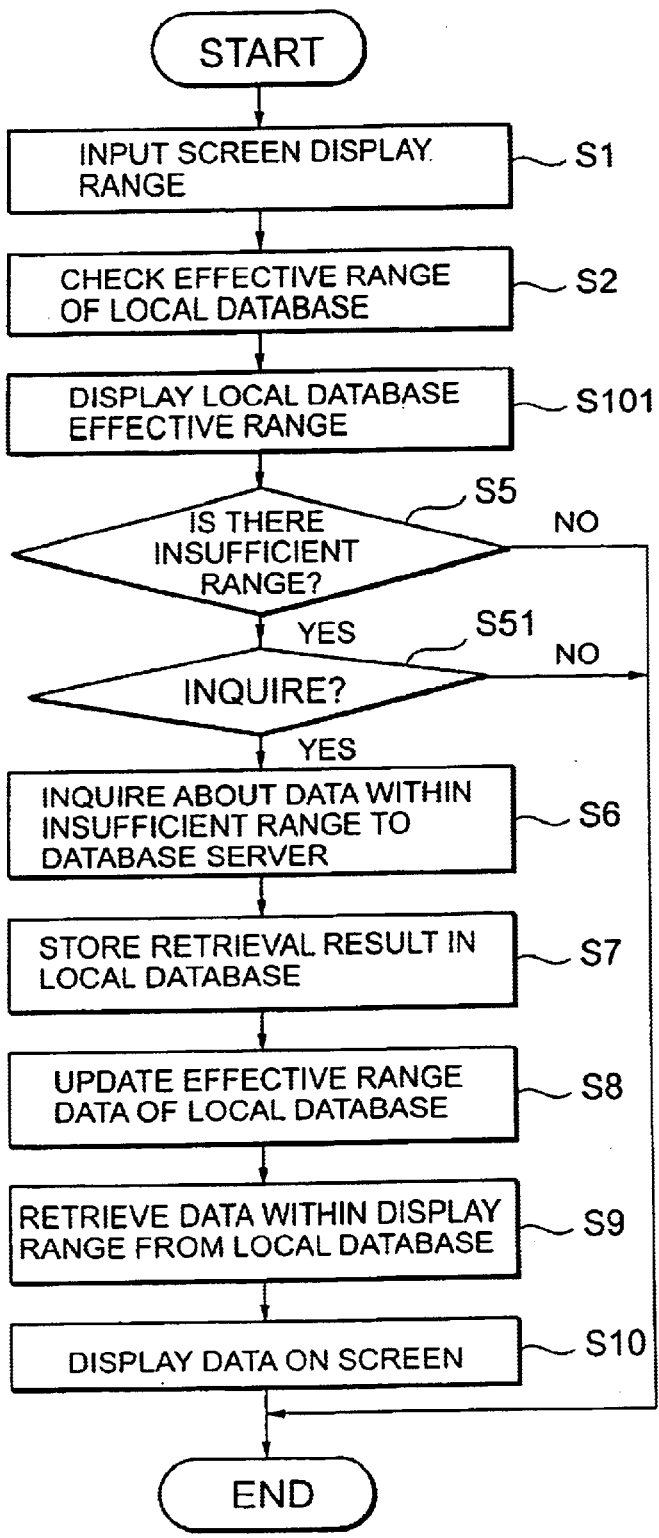
FIG. 16 is a flow chart showing the operation of the ninth embodiment shown in FIG. 15.

The operation of the present embodiment will be explained by referring to a flow chart shown in FIG. 16. Firstly, as shown in FIG. 16, the screen display request input means 11 obtains the geographic display request range in the form of the rectangular range which is requested by a user to be displayed (S1).

Next, the local database effective range check means 12 compares the rectangular range obtained by the screen display request input means 11 with the local database effective range information 13. As a result, the local database effective range check means 12 calculates an area which is insufficient in the local database 16 out of the rectangular range desired to be displayed by the user (S2).

Next, with respect to the area in which the data of the local database 16 can be used, the local database retrieval means 17 retrieves the data stored in the local database 16, and the retrieval result is displayed on the screen by the screen display means 18 (S101).

Next, as a result of the step S2, when there is an insufficient range in the local database 16, the local database effective range check means 12 goes to a next step S51. When there is no insufficient range in the step S5, the local database effective range check means 12 goes to the end without executing the steps S51 to S10 (S5). When it is found in the step S5 that there is the range which is insufficient in the local database 16, the server-side database inquiry confirmation means 114 confirms a user whether or not to inquire the data in the insufficient range to the database server 2 and receives the answer from the user (S51).

As a result, when no inquiry is made, the local database effective range check means 12 goes to the end without executing the steps S6 to S10 (S51). When an inquiry is made to the database server 2 inversely, the server-side database retrieval request means 14 outputs the retrieval request of the geographic information included in the insufficient range to the database server 2 (S6).

Next, the local database update means 15 divides the retrieval result returned from the database server 2 into components, that is, a set of broken lines showing roads and the structures of buildings, character strings on a map, and symbols of facilities arranged on the map, and stores them in the local database 16 (S7). The local database update means 15 adds the screen display range in the form of rectangular range obtained at the step S1 to the local database effective range information 13 (S8).

Next, the local database retrieval means 17 retrieves the information of the screen display range from the local database 16 (S9). The result retrieved at the step S9 is displayed by the screen display means 18 (S10).

According to the ninth embodiment, before an inquiry is made to the database server 2, the user can select whether or not to execute such inquiry. If the information sufficient to the operation can be obtained only from the information from the local database 16, it may be selected not to execute such inquiry to the database server 2 which requires a lot of time. As a result, an increase in the load on the client computer and an increase in the data transfer amount of the communication lines can be prevented.

Embodiment 10

Figure 17:
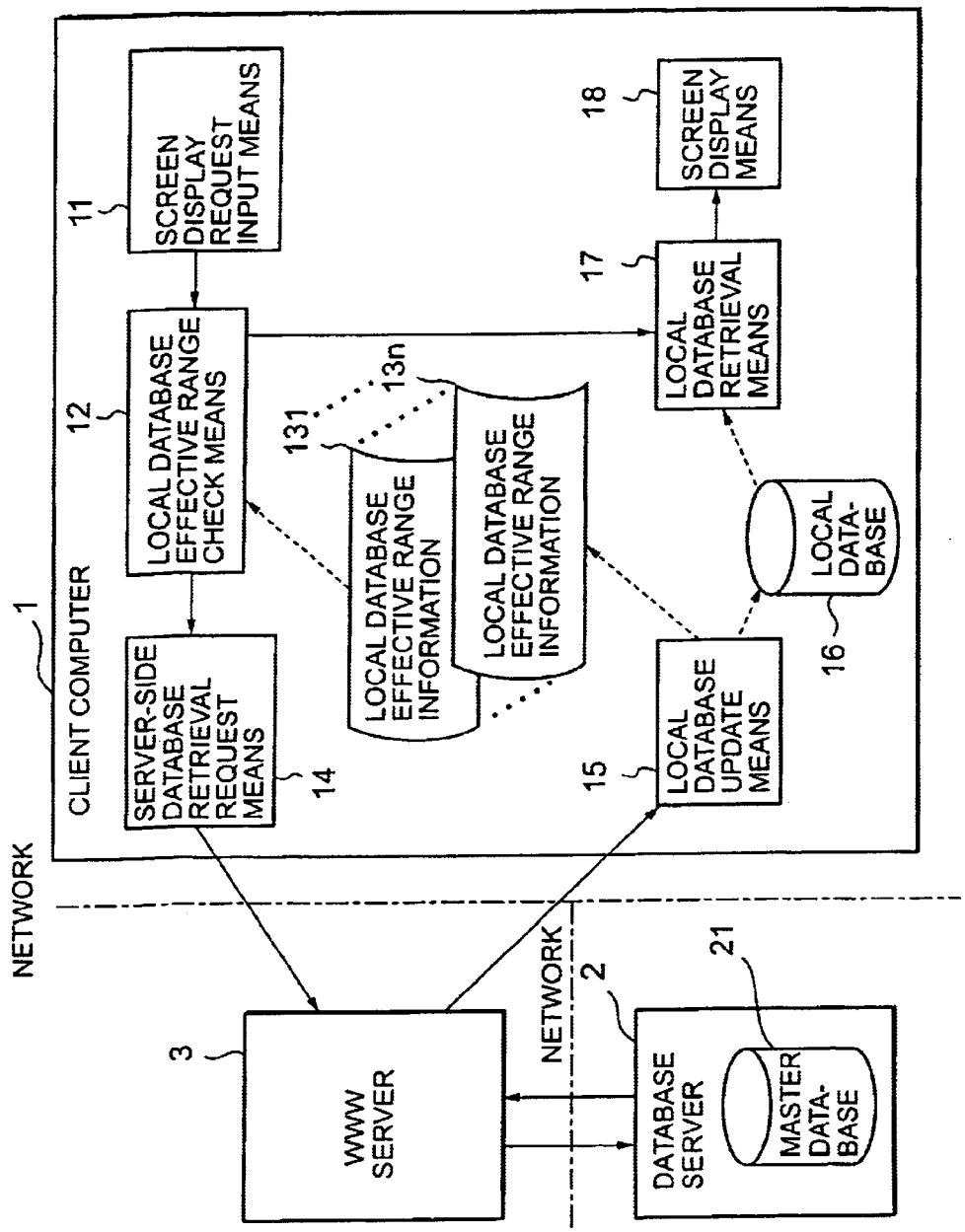
FIG. 17 is a block diagram of a geographic information indicator according to a tenth embodiment of the present invention.

FIG. 17 is a block diagram of a geographic information indicator showing a tenth embodiment of the present invention. In FIG. 17, the same numeral is assigned to each of the parts having the same functions as those shown in FIG. 1 and the explanation thereof will be omitted. The characteristic point of this embodiment in the construction is that a plurality of local database effective range informations 131, - - -, and 13n are provided instead of the single local database effective range information 13 in the first embodiment shown in FIG. 1. The other parts of the constitution are the same as those shown in FIG. 1.

Each of the local database effective range informations 131, - - -, and 13n is constructed the same as local database effective range information 13 of the first embodiment shown in FIG. 1, and is individually prepared for each meaning represented by each of the components constituting geographic information, for example, for each component representing a structure of a building or each component representing a town name.

When geographic information is to be displayed, all of the information stored in the rectangular range of the master database 21 are not always to be displayed. Instead, only necessary information is selectively displayed, for example, only the component representing a road is displayed. In this case, the screen display request input means 11 obtains a screen display request range from a user in the form of a rectangular range along with a kind of information to be displayed. For this reason, for the data obtained by an inquiry to the database server 2, only the information necessary for the screen display is obtained. The rectangular range is only added to the local database effective range informations 131, - - -, and 13n, corresponding to the kind of informations obtained by actually inquiring the database server 2.

According to the tenth embodiment, when only necessary information is to be selected and displayed, an inquiry is made only about the necessary information to the database server 2, and the retrieved result is stored in the local database 16. Accordingly, the data transfer amount can be reduced.

The method described in any embodiments mentioned above, can be applied to various devices by writing it as a program which can be executed by a computer into a storage medium such as a magnetic disk, an optical disk, or semiconductor memory. Furthermore, the method can be applied to various devices by transmitting it via a network as a program which can be executed by a computer by a communication medium. A computer for realizing the aforementioned method reads the program stored in the storage medium or receives the program via the network and is controlled in its operation by the program, thus executes the aforementioned process.

In the above-described embodiments of this invention, the extracted data from the local database is displayed on a screen. But this invention is not limited to such embodiments. Instead, the user may ask to obtain the geographic information via a network. This invention is applied to such case. In such case, the extracted data from the local database is transmitted to a terminal of the user, and the user can display the transmitted data on a screen at the terminal.

As explained above, according to the present invention, no inquiry is made about the information displayed once to the database server, so that the data transfer time can be shortened and the time required before screen display can be shortened.

Furthermore, according to the present invention, when a screen display request is made for the area overlapping with the area displayed in the past, the data overlapping with the data obtained in the past is overwritten in the local database. As a result, the utilization factor of the local database is increased.

Obviously, numerous modifications and variations of the present invention are possible in light of the above teachings. It is therefore to be understood that within the scope of the appended claims, the invention may be practiced otherwise than as specifically described herein.

Japanese Priority Patent Application No. Hei 11-285656, filed on Oct. 6, 1999, including the specification, drawings, claims and abstract, and is hereby incorporated by reference.

What is claimed is:

1. A geographic region indicator for displaying geographic information obtained via a network from a remote database server that stores said geographic information as a map and facilities to be arranged on said map, comprising:

a local database for storing data obtained from said database server as a result of an inquiry;

screen display request input device configured to input a screen display request range;

means for storing a plurality of effective ranges each having corresponding data stored in said local database, said effective ranges overlapping and corresponding to areas of said map;

local database effective range check device configured to decide at least one of first and second areas of said map within said screen display request range, said first area having corresponding data already stored in said local database and said second area having corresponding data not stored in said local database;

server-side database retrieval request device configured to retrieve, from said remote database server via said network, said data corresponding to said second area based on a decision result of said local database effective range check device;

local database update device configured to store the data corresponding to the second area and obtained as a retrieval result in said local database and also update said local database effective range information to include an effective range corresponding to said second area;

local database retrieval device configured to extract total data associated with said screen display range, including the data corresponding to said first area and the data corresponding to said second area, from said data stored in said local database; and screen display device configured to display said total data extracted from said local database on a screen.

2. The geographic region indicator according to claim 1, wherein:

said server-side database retrieval request device is further configured to retrieve, from said database server via said network, preset attribute data of facilities included in said first area based on said decision result of said local database effective range check device, even when said preset attribute data is stored in said first area of said local database; and said local database update device is further configured to overwrite said preset attribute data of said facilities obtained as a retrieval result from said database server on said data stored in said local database.

3. The geographic region indicator according to claim 1, wherein:

said server-side database retrieval request is further configured to asynchronously inquire said database server via said network about preset attribute data of facilities included in said first area of said local database effective range information so as to confirm whether or not said preset attribute data is updated; and said local database update device is further configured to overwrite asynchronously said preset attribute data of said facilities obtained as a retrieval result from said database server on said data stored in said first area of said local database effective range information in said local database, when said preset attribute data is updated.

4. The geographic region indicator according to claim 1, further comprising:

local database retrieval request input device configured to input a retrieval request to said local database, which is different in type from said screen display request;

wherein said local database retrieval device is configured to extract a different data based on a retrieval request from said local database retrieval request input device from said data stored in said local database; and said screen display device is further configured to display said different data extracted from said local database on said screen.

5. The geographic region indicator according to claim 1, further comprising:

local database insufficient range prediction device configured to predict, before a next screen display request is inputted from said screen display request input device, a third area having corresponding data assumed to be necessary for said next screen display request and not stored in said local database, said third area being a neighboring area of said screen display range displayed on said screen at present;

wherein said server-side database retrieval request device is further configured to retrieve, from said database server via said network, data included in said third area predicted by said local database insufficient range prediction device; and said local database update device is further configured to store the data included in the third area and obtained as a retrieval result in said local database and also update said local database effective range information based on said third area.

6. The geographic region indicator according to claim 1, further comprising:

local database access history storage device configured to store an access history of said local database in said local database effective range information; and local database unnecessary range deletion device configure to, when a memory capacity used by said local database at present is more than a preset size, delete data included in a 50 screen display range whose use frequency is the smallest from said local database and also to delete said screen display range whose use frequency is the smallest from said local database effective range information.

7. The geographic region indicator according to claim 1, further comprising:

data unregistered area retrieval request output device configured to inquire about a data unregistered area of said database server where no data is registered in said database server;

wherein said server-side database retrieval request device is configured to retrieve, from said database server via said network, said data unregistered area based on a request from said data unregistered area retrieval request output device; and said local database update device is configured to store said data unregistered area obtained as a retrieval result in said local database effective range information.

8. The geographic region indicator according to claim 1, wherein said local database retrieval device is configure to first extract said data included in said first area necessary for screen display from said data stored in said local database, and after said local database is updated with said data in said second area retrieved from said database server, said local database retrieval device then extracts said data included in said second area necessary for screen display from said data stored in said local database; and said screen display device is configured to display said data included in said first area and extracted from said local database on said screen, and then display said data included in said second area and extracted from said local database on said screen.

9. The geographic region indicator according to claim 1, further comprising:

server-side database inquiry confirmation device configured to confirm a user whether or not to retrieve said data included in said second area from said database server based on a decision result of said local database effective range check means;

wherein said server-side database retrieval request device is configured to retrieve, from said database server via said network, said data included in said second area only when said user requests to retrieve said data included in said second area; and said local database retrieval device is configured to only extract said data included in said first area necessary for screen display from said data stored in said local database when said user does not request to retrieve said data included in said second area.

10. The geographic region indicator according to claim 1, wherein:

said screen display request is configured to input said screen display request by designating said screen display range along with one of components constituting said information of said map and said facilities which is necessary for screen display;

said local database effective range information includes a plurality of local database effective range information, each being prepared for one of said components, respectively;

a decision by said local database effective range check device, an inquiry by said server-side database retrieval request device, an updating by said local database updating device and an extraction by said local database retrieval device are executed only with respect to said one of said components; and said screen display device is configured to selectively display said data extracted from said local database with respect to only one of said components on said screen.

11. A geographic region indicator for displaying geographic information obtained via a network from a remote database server that stores said geographic information as a map and facilities to be arranged on said map, comprising:

a local database for storing data obtained from said database server as a result of an inquiry;

screen display request input device configured to input a screen display request range in a form of a rectangular range;

means for storing a plurality of effective ranges each having corresponding data stored in said local database, said effective ranges overlapping and corresponding to rectangular ranges of said map;

local database effective range check device configured to decide at least one of first and second rectangular ranges of said map within said screen display request range, said first range having corresponding data already stored in said local database and said second range having corresponding data not stored in said local database;

server-side database retrieval request device configured to retrieve, from said remote database server via said network, said data corresponding to said second rectangular range based on a decision result of said local database effective range check device;

local database update device configured to store the data corresponding to the second rectangular range and obtained as a retrieval result in said local database, and also update said effective range in said local database effective range information to include an effective range corresponding to said rectangular range;

local database retrieval device configured to extract total data associated with said rectangular range, including the data corresponding to said first area and the data corresponding to said second area, from said data stored in said local database; and screen display device configured to display said total data extracted from said local database on a screen.

12. A program storing medium readable by a computer, tangibly embodying a program of instructions executable by said computer to perform method steps for a geographic region indicator for displaying data stored in a local database, which is obtained via a network from a remote database server that stores geographic information as a map and facilities to be arranged on said map, said method comprising the steps of:

a screen display request input step for inputting a screen display request range;

a step for storing a range having corresponding data stored in said local database in a form of a local database effective range information, said range corresponding to an area of said map;

a local database effective range check step for deciding at least one of first and second areas of said map within said screen display request range, said first area having corresponding data already stored in said local database and the second area having corresponding data not stored in said local database based on said local database effective range information;

a server-side database retrieval request step for retrieving, from said remote database server via said network, said data corresponding to said second area based on a decision result of said local database effective range check step;

a local database update step for storing said data corresponding to the second area and obtained as a retrieval result in said local database and also updating said local database effective range information to include an effective range corresponding to said second area;

a local database retrieval step for extracting total data included in said screen display range necessary for screen display including the data corresponding to said first area and the data corresponding to said second area; from said data stored in said local database; and a screen display step for displaying said total data extracted from said local database on a screen.

13. A method for indicating geographic region to supply a user data stored in a local database, which is obtained via a network, from a remote database server that stores geographic information as a map and facilities to be arranged on said map, said method comprising the steps of:

a step for urging said user to input a screen display request range;

a step for storing a range having corresponding data stored in said local database in a form of a local database effective range information, said range corresponding to an area of said map;

a step for deciding at least one of first and second areas of said map within said screen display range, said first area having corresponding data already stored in said local database and the second area having corresponding data not stored in said local database based on said local database effective range information;

a step for retrieving, from said remote database server via said network, said data corresponding to in said second area based on a decision result;

a step for storing said data corresponding to the second area and obtained as a retrieval result in said local database and also updating said local database effective range information to included effective range information corresponding to said second area;

a step for extracting total data included in said screen display range necessary for screen display including the data corresponding to said first area and the data corresponding to said second area, from said data stored in said local database; and a step for transmitting said total data extracted from said local database to a terminal of said user.

* * * * *